US006606586B1

United States Patent
Ishikawa

(10) Patent No.: US 6,606,586 B1
(45) Date of Patent: Aug. 12, 2003

(54) SIMULATION METHOD

(75) Inventor: Kiyoshi Ishikawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/305,277

(22) Filed: May 5, 1999

(30) Foreign Application Priority Data

Nov. 27, 1998 (JP) .......................................... P10-337298

(51) Int. Cl.⁷ .............................................. G06F 17/50
(52) U.S. Cl. .................... 703/5; 703/2; 702/57; 702/75
(58) Field of Search .................... 703/2, 5; 702/57, 702/75

(56) References Cited

U.S. PATENT DOCUMENTS

| | | | | |
|---|---|---|---|---|
| 5,220,398 A | * | 6/1993 | Horn et al. ................. | 356/152 |
| 5,471,435 A | * | 11/1995 | Marschall ................... | 367/135 |
| 5,826,215 A | * | 10/1998 | Garrett et al. ................ | 702/75 |
| 6,051,027 A | * | 4/2000 | Kapur et al. .................... | 703/5 |
| 6,182,023 B1 | * | 1/2001 | Ohtsu et al. ................... | 703/5 |

OTHER PUBLICATIONS

Y. L. Le Coz, et al. "A Stochastic Algorithm for High Speed Capacitance Extraction in Integrated Circuits", Solid–State Electronics, vol. 35, No. 7, 1992, pp. 1005–1012.

* cited by examiner

*Primary Examiner*—Krisna Lim
*Assistant Examiner*—Thai Phan
(74) *Attorney, Agent, or Firm*—Oblon, Spivak, McClelland, Maier & Neustadt, P.C.

(57) ABSTRACT

A physical quantity at a given position in an analysis space is expressed by using a Poisson's equation, a Green's function and the Green's theorem. The equation thus obtained is substituted into an unknown parameter in the equation, to be expanded into infinite series. Stopping the expansion when the equation is expanded to some degree, the equation can be expressed only with known parameters such as boundary conditions. Through calculating the respective values of integrations included in terms of the series by the Monte Carlo method and adding them up, a physical quantity at a given position can be thereby obtained. Further, by the same method, a parasitic element constant at a given position in the analysis space can be also obtained. With this method, a simulation is achieved for obtaining a physical quantity and a parasitic element constant at a given position in an analysis space, without solving a matrix equation.

19 Claims, 5 Drawing Sheets

SIMULATION METHOD

BACKGROUND OF THE INVENTION

1. Field of the Invention

The present invention relates to a simulation method for obtaining a physical quantity such as a potential inside an electrical element such as a semiconductor device, or parasitic element constants such as capacitance, resistance and inductance by numerical analysis.

2. Description of the Background Art

As an electrical element such as a semiconductor device becomes smaller, an effect that a parasitic element produces on the electrical element becomes relatively greater, so a quantitative grasp on the effect is required. It is generally difficult to obtain the parasitic element constant which quantitatively indicates the effect of the parasitic element by measurement of a practical device, and therefore the parasitic element constant is obtained by a simulation of numerical analysis with a computer.

Through this simulation, a numerical analysis is performed on a physical quantity (e.g., potential, temperature and the like) in a given position inside the electrical element, accompanying computation of the parasitic element constant. As a method of numerical analysis, the FEM (finite element method), the FDM (finite difference method) or the BEM (boundary element method) is often used.

Discussion will be made below on an exemplary case where a value of parasitic capacitance of a conductor in a two-dimensional analysis region is numerically analyzed by the finite difference method using the control volume method.

An direct object of the finite difference method is to obtain a physical quantity in a point of intersection (referred to as "node") of mesh (hereinafter, for simple discussion, a potential is adopted as a specific example of the physical quantity, and discussion is based thereon unless otherwise specified).

FIG. 9 illustrates a structure of a region to be analyzed. This figure shows a partial region VP of an electrical element and the region VP consists of a conductor region CR1 and a dielectric region DR1 having a dielectric constant of ∈. The region VP is divided into meshes on expression (the conductor region CR1 is not divided into meshes since uniform potential exists in an electrostatic field inside the conductor region CR1). The conductor region CR1 has material boundaries C1 and C2 and is separated thereby from others. The dielectric region DR1 has material boundaries C2 and C3 and analysis boundaries D1 an D2 and is separated thereby from others. In the material boundary C3, the dielectric region DR1 adjoins a not-shown conductor region. Herein, the analysis boundary refers to a limit of an analyzable region and the material boundary refers to a boundary where different materials adjoin.

It is assumed in FIG. 9 that for example, the potentials at the nodes on the material boundaries C2 and C3 and the normal components of electric fields (derivative of potential to position) relative to interfaces (hereinafter, referred to as "normal differential of potential") at the nodes on the analysis boundaries D1 and D2 are given as boundary conditions. A node having an unknown quantity to be obtained is represented by a blank circle (○), a node given a value of potential as a boundary condition is represented by a solid circle (●) and a node given a value of normal differential of potential as a boundary condition is represented by a double circle ((◎)). In a case of FIG. 9, the unknown quantity to be obtained is a potential at the node represented by ○ and there are 36 nodes of ○ in the whole region VP. Values of potentials at the 36 points should be obtained under the above boundary conditions.

From the potential distribution thus obtained, the amount of electric charges that the conductor region CR1 and other not-shown conductor regions have under the respective boundary conditions is calculated, to obtain the parasitic capacitance of the conductor through numerical analysis.

As another exemplary case for obtaining the parasitic capacitance of the conductor in the two-dimensional analysis region, numeric analysis by the boundary element method will be discussed below.

FIG. 10 illustrates a structure of a region to be analyzed. This figure shows the same region VP as FIG. 9 by different expression. In the boundary element method, insince the boundary is expressed like a polygonal line and an object is to obtain the potential or its normal differential at each segment line (hereinafter, referred to as "boundary element"), the inside of the dielectric region DR1 is not expressed in a form of mesh. In FIG. 10, the boundary elements are represented by the nodes (●, ◎) which are points of intersection of the boundary elements, like in FIG. 9.

In the boundary element method, at each boundary element, the value of either one of the potential and its normal differential is given as a boundary condition and the value of the other is the unknown quantity to be obtained. Therefore, in the case of FIG. 10, the potential is unknown at the node ◎ and the normal differential of potential is unknown at the node ●, and there are 35 unknown quantities in the whole region VP.

Next, a method for obtaining an unknown quantity in this region VP and its theoretical ground will be discussed. Hereinafter, a region to be analyzed (referred to as "analysis space") is represented by V and a close boundary existing inside the analysis space V is represented by S. When the analysis space V is assumed to be an electrical element, the inside of the boundary S is conductive and the outside is dielectric.

From the Gauss' law, $$\text{div } \vec{D} = \rho \qquad (1)$$

is true. Further, from the definition of electric field and dielectric flux density, $$\vec{D} = \in \vec{E} = -\in \text{ grad } \psi \qquad (2)$$

is also true where $\vec{D}$, $\rho$, $\in$, $\vec{E}$ and $\psi$ represent a dielectric flux density vector, a charge density, a dielectric constant, an electric field vector and a potential, respectively. An arrow above the reference sign indicates a vector sign.

Substituting Eq. 2 into Eq. 1, the Poisson's equation as expressed by $$\text{div}(\text{grad } \psi) = \Delta \psi = -\frac{\rho}{\varepsilon} \qquad (3)$$

is obtained. If $\rho=0$. Eq.3 is the Laplace's equation.

The Green's function $G(\vec{x}, \vec{x}')$ is defined as a function satisfying $$\Delta G(\vec{x}, \vec{x}') = -\delta(\vec{x} - \vec{x}') \qquad (4)$$

$$G(\vec{x}, \vec{x}') = 0 \text{ (where } |x'| \to \text{ )} \qquad (5)$$

where $\vec{x}$, $\vec{x}'$, $\Delta$ and $\delta$ represent a position vector for a given position in the analysis space V, a position vector for a given point on the boundary S in the analysis space V, Laplacian with respect to $\vec{x}$ and Dirac's delta function, respectively. The Green's function $G(\vec{x}, \vec{x}')$ is a solution to the boundary problem with respect to $\vec{x}$ when the unit charge is put on the position of $\vec{x}'$, from physical interpretation.

The Dirac's delta function $\delta$ satisfies, from its definition, $$\int_V dV' \psi(\vec{x}') \delta(\vec{x}-\vec{x}') = \psi(\vec{x}) \tag{6}$$

where dV' represents a variable of integration in the analysis space V.

Spatial dimension for $\vec{x}$ and $\vec{x}'$ is arbitrary. It is known that for example, in a case of two dimensions, the Green's function $G(\vec{x}, \vec{x}')$ is expressed as $$G(\vec{x}, \vec{x}') = -\frac{1}{2\pi} \ln|\vec{x} - \vec{x}'| \tag{7}$$

and in a case of three dimensions, the Green's function is expressed as $$G(\vec{x}, \vec{x}') = \frac{1}{4\pi} \frac{1}{|\vec{x} - \vec{x}'|} \tag{8}$$

Applying the Green's theorem to the analysis space V and the boundary S using the potential $\psi(\vec{x}')$ on the boundary S and the Green's function $G(\vec{x}, \vec{x}')$, $$\oint_S dS' \vec{n}' \cdot \{G(\vec{x},\vec{x}')\nabla'\psi(\vec{x}') - \psi(\vec{x}')\nabla'G(\vec{x},\vec{x}')\} = \int_V dV'\{G(\vec{x},\vec{x}')\Delta'\psi(\vec{x}') - \psi(\vec{x}')\Delta'G(\vec{x},\vec{x}')\} \tag{9}$$

is true where dS', $\vec{n}'$, $\nabla'$ and $\Delta'$ represent a variable of integration on the boundary S, an outward unit normal vector on the boundary S, a gradient with respect to $\vec{x}'$ and Laplacian with respect to $\vec{x}'$, respectively.

Transforming Eq. 9 by using Eqs. 3, 4 and 6, $$\psi(\vec{x}) = \int_V dV'G \cdot (\vec{x},\vec{x}')\rho(\vec{x}') + \oint_S dS' \vec{n}' \cdot \{G(\vec{x},\vec{x}')\nabla'\psi(\vec{x}') - \psi(\vec{x}')\nabla'G(\vec{x},\vec{x}')\} \tag{10}$$

is obtained. In other words, the potential $\psi(\vec{x})$ at a given point (position $\vec{x}$) inside the analysis space V can be expressed by using the Green's function $G(\vec{x},\vec{x}')$ and the values of parameters ($\psi(\vec{x}')$, $\vec{n}'$ and the like) at a point (position $\vec{x}'$) on the boundary S.

As to a region having no independent charge therein, such as a dielectric, in the analysis space V, it is assumed that $\rho=0$ in Eq. 10. Then, Eq. 10 is expressed as $$\psi(\vec{x}) = \oint_S dS' \vec{n}' \cdot \{G(\vec{x},\vec{x}')\nabla'\psi(\vec{x}') - \psi(\vec{x}')\nabla'G(\vec{x},\vec{x}')\} \tag{11}$$

In Eq. 11, since the Green's function $G(\vec{x},\vec{x}')$ is known as shown in Eq. 7 or 8 and either one of the potential $\psi(\vec{x}')$ at $\vec{x}'$ and the normal differential $\vec{n}' \cdot \nabla'\psi(\vec{x}')$ of potential is given as a boundary condition, the other which is unknown can be obtained by performing integral calculus.

When the numerical analysis is performed with computer, approximating the integral, Eq. 11 is expressed in terms of such a matrix equation (where A, $\Psi$ and B represent a coefficient matrix, a solution to be obtained and an absolute term, respectively) as $$A\Psi = B \tag{12}$$

and Eq. 12 is solved numerically to obtain the solution $\Psi$.

How to obtain the parasitic capacitance is as follows. From the Gauss' law, the normal differential $\vec{n}' \cdot \nabla'\psi(\vec{x}')$ of potential is integrated with respect to the variable of integration dS' on the boundary S between the conductor and the dielectric to obtain the amount of electric charges. With variation of the potential $\psi_j$ of the j-th conductor, the amount of electric charges $Q_i$ of the i-th (i≠j) conductor induced thereby is computed, to obtain the parasitic capacitance $C_{i,j}$ between the i-th conductor and the j-th conductor as $$C_{i,j} = \frac{\partial Q_i}{\partial \psi_j} \tag{13}$$

In these methods, however, an increased number of meshes imposes overload on calculation performance of a CPU and memory capacity in the computer since fragmented nodes and boundary elements are used in accordance with complicated shape of the material to meet the requirement for higher accuracy of analysis, and as a result, it is disadvantageously impossible to broaden an analyzable region. Specifically, the matrix equation of Eq. 12 becomes larger and the use of memory region and calculation time increase. Moreover, it is disadvantageously impossible to obtain approximate solution until the computer completes the matrix equation. These problems especially become prominent in obtaining the potential and parasitic element constant inside a semiconductor device of three-dimensionally complicated shape.

The analysis made by the boundary element method advantageously uses less equations than those made by the finite element method and the finite difference method since the unknown quantity exists only on the boundary. On the other hand, the equations to be solved are disadvantageously complicated. Therefore, the analysis by the boundary element method is not much different from those by the finite element method and the finite difference method in terms of calculation time and the amount of calculations.

In any method, there are still problems that the use of memory region and calculation time increase and the approximate solution can not be obtained until the equations are completely solved. Further, the accuracy of calculated value is found after the equations are completely solved, and therefore it is impossible to perform calculation with desired accuracy determined in advance.

SUMMARY OF THE INVENTION

The present invention is directed to a simulation method. According to a first aspect of the present invention, the simulation method comprises the steps of: (a) expressing a first function representing a first physical quantity (potential, temperature) satisfying a Poisson's equation with respect to a first variable indicating a given position in an analysis space comprising at least one region having a boundary comprising information on position and boundary condition in a form of a first integral with a difference, as a first integrand, between a product of a second function repre- senting the first physical quantity with respect to a second variable indicating a position on the boundary and a first derivative representing a normal component on the boundary out of a differentiated result of a first Green's function on the first and second variables and the first physical quantity with respect to the second variable and a product of the first Green's function and a second derivative representing a normal component on the boundary out of a differentiated result of the second function with respect to the second variable, the boundary as a first integral region and the second variable as a first variable of integration; and (b) substituting the first integral sequentially into either one of the second function and the second derivative that is not given as the boundary condition while updating the first variable of integration.

According to a second aspect of the present invention, the simulation method of the first aspect further comprises the steps of: (c) expressing the first function as a sum of series and obtaining values of first to m-th (m≧1) terms out of the sum of series by using the information on position and boundary condition that the boundary comprises; and (d) adding all the values of the first to m-th terms obtained in the step (c) to numerically calculate a value of the first function.

According to a third aspect of the present invention, in the simulation method of the first aspect, the at least one region means a plurality of regions, and the method further comprises the steps of: (c) expressing a third function representing a second physical quantity (the amount of electric charges) in a first region which is one of the plurality of regions in a form of a second integral with a product of a third derivative representing a normal component on the boundary of the first region out of a differentiated result of the first function with respect to the first variable on the boundary of the first region and a physical constant depending on a material of the first region as a second integrand, the first variable as a second variable of integration and the boundary of the first region as the second integral region; and (d) performing the step (b) on a fourth function representing a parasitic element constant between the first region and a second region which is one of the plurality of regions obtained by differentiating the third function with respect to the second function in the second region to express the fourth function as a sum of series and obtaining values of first to n-th (n≧1) terms out of the sum of series by using the information on position and boundary condition that the boundary comprises; and (e) adding all the values of the first to n-th terms obtained in the step (d) to numerically calculate a value of the fourth function.

According to a fourth aspect of the present invention, the simulation method of the first aspect further comprises the steps of: (c) expressing a third function representing a second physical quantity (current) in the region in a form of a second integral with a product of a third derivative representing a normal component on the boundary out of a differentiated result of a first function with respect to the first variable on the boundary and a first physical constant depending on a material of the region as a second integrand, the first variable as a second variable of integration and the boundary as the second integral region; and (d) performing the step (b) on the third function to express the third function as a first sum of series and obtaining values of first to p-th (p≧1) terms out of the first sum of series by using the information on position and boundary condition that the boundary comprises; and (e) adding all the values of the first to p-th terms obtained in the step (d) to numerically calculate a value of the third function.

According to a fifth aspect of the present invention, the simulation method of the fourth aspect further comprises the step of: (f) dividing difference between the second function of a position in the region and the second function of another position in the region by the third function, to numerically calculate a value of a fourth function representing a parasitic element constant (parasitic resistance, parasitic thermal resistance) in the region.

According to a sixth aspect of the present invention, the simulation method of the fourth aspect further comprises the steps of: (f) expressing a fourth function representing a parasitic element constant (self-inductance) in the region in a form of a fourth integral, using a third variable and a fourth variable both of which indicate positions in the region and a fifth function expressed in a form of a third integral with a product obtained by multiplying a fourth derivative representing a differentiated value of the first function with respect to the fourth variable in the region by the first physical constant and a second Green's function on the third and fourth variables and the first physical quantity as a third integrand, the fourth variable as a third variable of integration and the region as a third integral region, with a product obtained by multiplying an inner product of the fifth function and a fifth derivative representing a differentiated value of the first function with respect to the third variable in the region by the first physical constant, a second physical constant depending on a material of the region and the inverse of the square of a value of the third function as a fourth integrand, the third variable as a fourth variable of integration and the region as a fourth integral region; (g) performing the step (b) on the fourth function to express the fourth function as a second sum of series and obtaining values of first to q-th (q≧1) terms out of the second sum of series by using the information on position and boundary condition that the boundary comprises; and (h) adding all the values of the first to q-th terms obtained in the step (g) to numerically calculate a value of the fourth function.

According to a seventh aspect of the present invention, in the simulation method of the first aspect, the at least one region means a plurality of regions, and the method further comprises the steps of: (c) expressing a third function representing a second physical quantity in a first region which is one of the plurality of regions in a form of a second integral with a third variable representing a position on a first boundary which the first region has as a second variable of integration, a product of a third derivative representing a normal component on the first boundary out of a differentiated result of the first function with respect to the third variable on the first boundary and a first physical constant depending on a material of the first region as a second integrand and the first boundary as a second integral region; and (d) performing the step (b) on the third function to express the third function as a first sum of series and obtaining values of first to r-th (r≧1) terms out of the first sum of series by using the information on position and boundary condition that the boundary comprises; (e) adding all the values of the first to r-th terms obtained in the step (d) to numerically calculate a value of the third function; (f) expressing a fourth function representing a second physical quantity in a second region which is one of the plurality of regions in a form of a third integral with a fourth variable representing a position on a second boundary which the second region has as a third variable of integration, a product of a fourth derivative representing a normal component on the second boundary out of a differentiated result of the first function with respect to the fourth variable on the second boundary and a second physical constant depending on a material of the second region as a third integrand and the second boundary as a third integral region; and (g) performing the step (b) on the fourth function to express the fourth function as a second sum of series and obtaining values of first to s-th (s≧1) terms out of the second sum of series by using the information on position and boundary condition that the boundary comprises; (h) adding all the values of the first to s-th terms obtained in the step (g) to numerically calculate a value of the fourth function; (i) expressing a fifth function representing a parasitic element constant between the first and second regions in a form of a fifth integral, using a fifth variable representing a position in the first region, a sixth variable representing a position in the second region and a sixth function expressed in a form of a fourth integral with a product obtained by multiplying a fifth derivative representing a differentiated result of the first function with respect to the sixth variable in the second region by the second physical constant and a second Green's function on the fifth and sixth variables and the first physical quantity as a fourth integrand, the sixth variable as a fourth variable of integration and the second region as a fourth integral region, with a product obtained by multiplying an inner product of the sixth function and a sixth derivative representing a differentiated result of the first function with respect to the fifth variable in the first region by the first physical constant, a third physical constant depending on a material of the first region, the inverse of the third function and the inverse of the fourth function as a fifth integrand, the fifth variable as a fifth variable of integration and the first region as a fifth integral region; () performing the step (b) on the fifth function to express the fifth function as a third sum of series and obtaining values of first to t-th (t≧1) terms out of the third sum of series by using the information on position and boundary condition that the boundary comprises; and (k) adding all the values of the first to t-th terms obtained in the step () to numerically calculate a value of the fifth function.

By using the simulation method of the first aspect of the present invention, either one of the second function and the second derivative that is not given as the boundary condition can be expressed in a form of numerically-calculable function.

By using the simulation method of the second aspect of the present invention, since the first function is obtained as the sum of the values of the first to the m-th terms in an expression where the first function is expanded into the sum of series, the calculation can be performed by the number of the terms in accordance with a predetermined accuracy and stopped before the following term without changing the number of boundary elements for a change of calculation accuracy.

By using the simulation method of the third aspect of the present invention, since the fourth function is obtained as the sum of the values of the first to the n-th terms in an expression where the fourth function is expanded into the sum of series, the calculation can be performed by the number of the terms in accordance with a predetermined accuracy and stopped before the following term without changing the number of boundary elements for a change of calculation accuracy. Further, more accurate value of the fourth function can be obtained in consideration of distribution of physical quantities. Furthermore, the value of the fourth function can be obtained without obtaining the value of the first function.

By using the simulation method of the fourth aspect of the present invention, since the third function is obtained as the sum of the values of the first to the p-th terms in an expression where the third function is expanded into the first sum of series, the calculation can be performed by the number of the terms in accordance with a predetermined accuracy and stopped before the following term without changing the number of boundary elements for a change of calculation accuracy. Further, more accurate value of the third function can be obtained in consideration of distribution of physical quantities. Furthermore, the value of the third function can be obtained without obtaining the value of the first function.

By using the simulation method of the fifth aspect of the present invention, since the fourth function is obtained after the third function is obtained as the sum of the values of the first to the p-th terms in an expression where the third function is expanded into the first sum of series, the calculation can be performed by the number of the terms in accordance with a predetermined accuracy and stopped before the following term without changing the number of boundary elements for a change of calculation accuracy. Further, more accurate value of the fourth function can be obtained in consideration of distribution of physical quantities. Furthermore, the value of the fourth function can be obtained without obtaining the value of the first function.

By using the simulation method of the sixth aspect of the present invention, since the fourth function is obtained as the sum of the values of the first to the q-th terms in an expression where the fourth function is expanded into the second sum of series, the calculation can be performed by the number of the terms in accordance with a predetermined accuracy and stopped before the following term without changing the number of boundary elements for a change of calculation accuracy. Further, more accurate value of the fourth function can be obtained in consideration of distribution of physical quantities. Furthermore, the value of the fourth function can be obtained without obtaining the value of the first function.

By using the simulation method of the seventh aspect of the present invention, since the fifth function is obtained as the sum of the values of the first to the t-th terms in an expression where the fifth function is expanded into the third sum of series, the calculation can be performed by the number of the terms in accordance with a predetermined accuracy and stopped before the following term without changing the number of boundary elements for a change of calculation accuracy. Further, more accurate value of the fifth function can be obtained in consideration of distribution of physical quantities. Furthermore, the value of the fifth function can be obtained without obtaining the value of the first function.

An object of the present invention is to provide a simulation method which allows reduction in use of memory region and calculation time when it is required to quickly obtain an approximate solution even with low calculation accuracy and allows a calculated value of high accuracy to be obtained when high calculation accuracy is required even though the use of memory region and calculation time increase.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Figure 1:
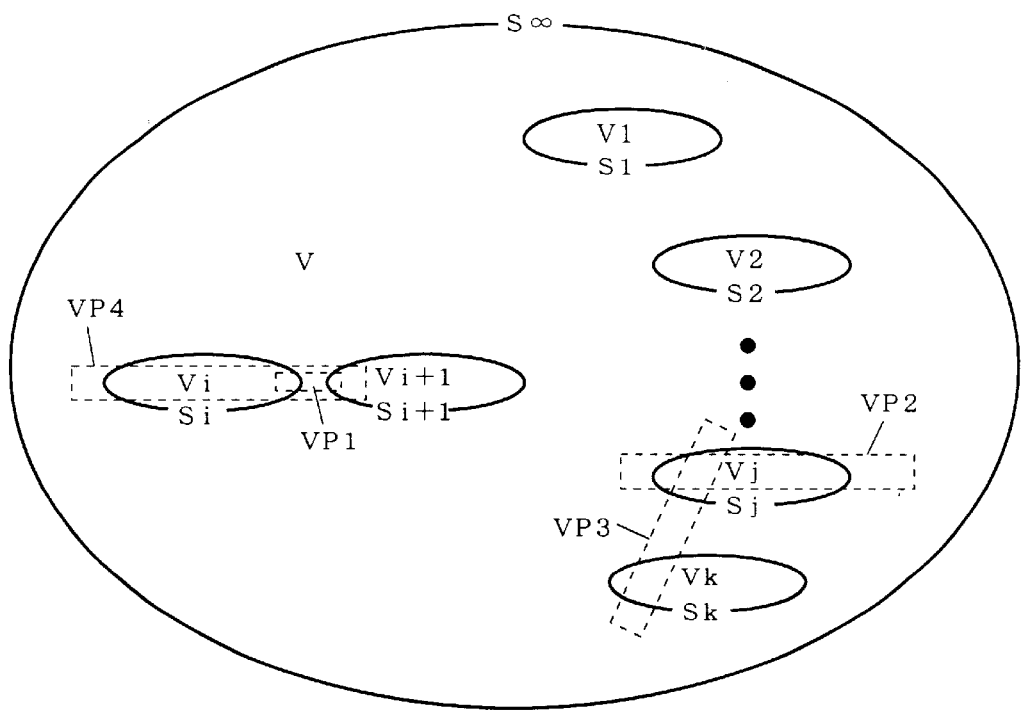
FIG. 1 illustrates a model of an analysis space in accordance with first to fifth preferred embodiments of the present invention.

FIG. 1 illustrates a model of an analysis space V having a boundary S∞ of infinity. In the analysis space V, there exist regions $V_1, V_2, \ldots, V_i, \ldots, V_j, \ldots, V_N$ ($N \geq 1$) having boundaries $S_1, S_2, \ldots, S_i, \ldots, S_j, \ldots, S_N$, respectively. Applying the model view to the electrical element such as a semiconductor device, the regions $V_1$ to $V_N$ correspond to conductor regions and other portions in the analysis space V correspond to dielectric regions. One of a potential and a normal differential of potential on the boundaries $S_1$ to $S_N$ is given as a boundary condition. Further, the potential and the normal differential of potential on the boundary S∞ of infinity are each assumed to be 0. In this preferred embodiment, the value of the potential $\psi(\vec{x})$ at a given point ($\vec{x}$) in the analysis space V is expressed in a form of equation obtained by developing Eq. 11.

Herein, it is assumed, for simple discussion, that the charge density ρ in a region other than the regions $V_1$ to $V_N$ inside the analysis space V is 0, and a Dirichlet's boundary condition, specifically, a boundary condition for the potential on the boundaries $S_1$ to $S_N$ is given.

In this case, if $$S = \sum_{j=1}^{N} S_j \qquad (14)$$

Eq. 11 is true with S replaced by $S_j$.

As to the term on the right side of Eq. 11, since $\underline{n}'$ is known from positional information of the boundaries $S_1$ to $S_N$, the potential $\psi(\vec{x}')$ is known from the boundary condition, the Green's function $G(\vec{x}, \vec{x}')$ is known from Eq. 7 or 8 and the normal differential $\vec{n}' \cdot G(\vec{x}, \vec{x}')$ of the Green's function is known from calculation using the Green's function $G(\vec{x}, \vec{x}')$, only the normal differential $\vec{n}' \cdot \nabla' \psi(\vec{x}')$ of potential on the boundary is unknown.

In Eq. 11, when $\vec{x}$ is technically converted into $\vec{x}'$ and $\vec{x}'$ is technically converted into $\vec{x}''$, $$\psi(\vec{x}') = \phi \int_S dS'' n'' \cdot \{G(\vec{x}', \vec{x}'') \nabla'' \psi(\vec{x}'') - \psi(\vec{x}'') \nabla'' G(\vec{x}', \vec{x}'')\} \qquad (15)$$

is obtained. Assuming the relation between $\vec{x}''$ and $\vec{x}'$ is the same as that between $\vec{x}'$ and $\vec{x}$, $\vec{x}''$ is also a position vector on the boundaries $S_1$ to $S_N$.

Substituting Eq. 15 into the unknown letter $\vec{n}' \cdot \nabla' \psi(\vec{x}')$, $$\psi(\vec{x}) = -\phi \int_S dS' \{\psi(\vec{x}') \vec{n}' \cdot \nabla' G(\vec{x}, \vec{x}')\} + \phi \int_S dS' \vec{n}' \cdot \{G(\vec{x}, \vec{x}') \nabla' \{\phi \int_S dS'' \vec{n}'' \cdot \{G(\vec{x}', \vec{x}'') \nabla'' \psi(\vec{x}'') - \psi(\vec{x}'') \nabla'' G(\vec{x}', \vec{x}'')\}\}\} \qquad (16)$$

is obtained. Specifically, the variable of integration of Eq. 11 is updated from $\vec{x}'$ indicating a position on the boundary to $\vec{x}''$ indicating a position on the boundary and substituted into the equation. As is clear from the right side of Eq. 16, the unknown normal differential $\vec{n}'' \cdot \nabla'' \psi(\vec{x}'')$ of potential on the boundary exists in the last term of the expanded equation and all the former terms are expressed by known quantities. Therefore, by repeating the same conversion as in Eq. 15 obtained is $$\psi(\vec{x}) = -\oint_S dS' \{\psi(\vec{x}') \vec{n}' \cdot \nabla' G(\vec{x}, \vec{x}')\} - \qquad (17)$$

$$\oint_S dS' \{G(\vec{x}, \vec{x}') \vec{n}' \cdot \nabla' \{\oint_S dS'' \{\psi(\vec{x}'') \nabla'' G(\vec{x}', \vec{x}'') \cdot \vec{n}''\}\}\} +$$

$$\oint_S dS' \{G(\vec{x}, \vec{x}') \vec{n}' \cdot \nabla' \{\oint_S dS'' \{G(\vec{x}', \vec{x}'') \nabla'' \psi(\vec{x}'') \cdot \vec{n}''\}\}\} =$$

$$-\oint_S dS' \{\psi(\vec{x}') \vec{n}' \cdot \nabla' G(\vec{x}, \vec{x}')\} -$$

$$\oint_S dS' \{G(\vec{x}, \vec{x}') \vec{n}' \cdot \nabla' \{\oint_S dS'' \{\psi(\vec{x}'') \nabla'' G(\vec{x}', \vec{x}'') \cdot \vec{n}''\}\}\} +$$

$$\oint_S dS' \{G(\vec{x}, \vec{x}') \vec{n}' \cdot \nabla' \{\oint_S dS'' \{G(\vec{x}', \vec{x}'') \vec{n}'' \cdot$$

$$\nabla'' \{\oint_S dS''' \vec{n}''' \cdot \{G(\vec{x}'', \vec{x}''') \nabla''' \psi(\vec{x}''') -$$

$$\psi(\vec{x}''') \nabla''' G(\vec{x}'', \vec{x}''')\}\}\}\} =$$

$$\cdots = -\oint_S dS^{(1)} \{\psi(\vec{x}^{(1)}) \vec{n}^{(1)} \cdot \nabla^{(1)} G(\vec{x}^{(0)}, \vec{x}^{(1)})\} -$$

$$\sum_{n=1}^{\infty} \{\oint_S dS^{(1)} \{G(\vec{x}^{(0)}, \vec{x}^{(1)}) \vec{n}^{(1)} \cdot$$

$$\nabla^{(1)} \{\oint_S dS^{(2)} \{G(\vec{x}^{(1)}, \vec{x}^{(2)}) \vec{n}^{(2)} \cdot \nabla^{(2)} \{\cdots$$

$$\oint_S dS^{(n-1)} \{G(\vec{x}^{(n-2)}, \vec{x}^{(n-1)}) \vec{n}^{(n-1)} \cdot$$

$$\nabla^{(n-1)} \{\oint_S dS^{(n)} \{G(\vec{x}^{(n-1)}, \vec{x}^{(n)}) \vec{n}^{(n)} \cdot$$

$$\nabla^{(n)} \{\oint_S dS^{(n+1)} \{\psi(\vec{x}^{(n+1)}) \nabla^{(n+1)} G(\vec{x}^{(n)},$$

$$\vec{x}^{(n+1)}) \cdot \vec{n}^{(n+1)}\}\}\} \cdots \}\}$$

where (n) represents the number of prime (′), and $\vec{x}^{(0)} = \vec{x}$.

Thus, when the unknown letter $\vec{n}^{(n)} \cdot \nabla^{(n)} \psi(\vec{x}^{(n)})$ is expanded and the expression of infinite series is adopted, $\psi(\vec{x})$ on the left side can be technically expressed only with the known quantities. Actually, however, since calculation can not be performed with infinite series, the calculation is made by the number m (m≧2) of terms and the following terms including the unknown letter $n^{(m+1)} \cdot \nabla^{(m+1)} \psi(x^{(m+1)})$ are ignored.

Further, as can be seen from Eq. 17, at every expansion, differential operation $\nabla$, multiplication by the Green's function and integral calculus with respect to the boundary S are performed. Considering that the Green's function is expressed with Eqs. 7 and 8, the value of the high-order term component of n decreases even though the integral calculus with respect to the boundary S is performed. Therefore, since the unknown quantity $n^{(n)} \cdot \nabla^{(n)} \psi(x^{(n)})$ makes less contribution to $\psi(\vec{x})$ on the left side as the number n of expansions increases, the numerical calculation may be stopped when the number of calculated terms becomes the necessary number m in accordance with a required accuracy.

Figure 2:
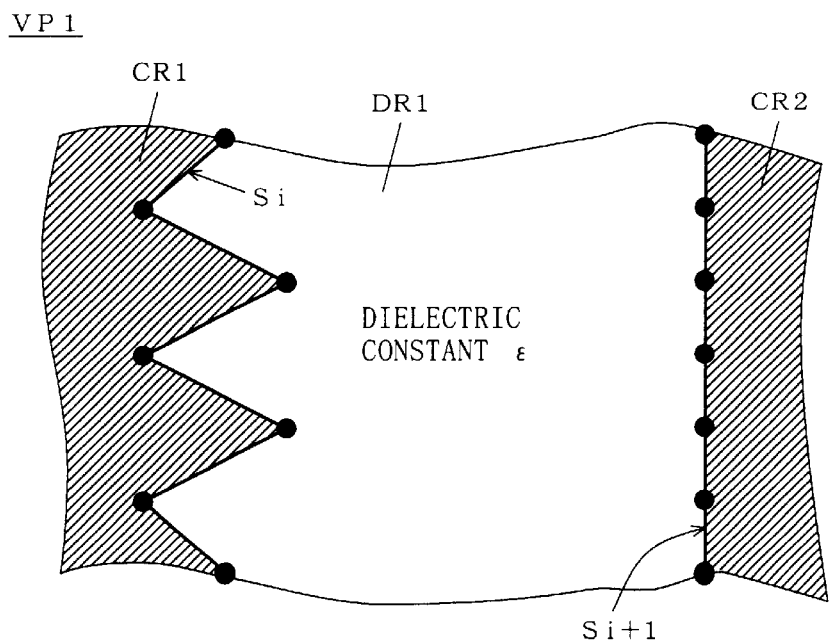
FIG. 2 illustrates part of the analysis space in accordance with the first and second preferred embodiments of the present invention.

Based on such a mathematical ground, discussion will be presented on a method of obtaining the value of potential at a given position ($\vec{x}$) on the region V in the two-dimensional view of FIG. 2 by numerical analysis. FIG. 2 is an enlarged view of a partial region VP1 in the analysis space V of the model view of FIG. 1.

In FIG. 2, the boundary $S_i$ separates the conductor region CR1 and the dielectric region DR1 having a dielectric constant $\in$, and the boundary $S_{i+1}$ separates the conductor region CR2 and the dielectric region DR1. The boundaries $S_i$ and $S_{i+1}$ each consist of a plurality of boundary elements. The node ● is regarded as a representative point of boundary elements and is given positional (coordinate) information and the value of potential as a boundary condition. With this, $\vec{x}'$ is given as a numerical value of coordinate of the node ●. Further, with the coordinates of adjacent nodes, a unit normal vector $\vec{n}'$ of each boundary element can be given as a numerical value.

First, a position whose potential should be obtained, i.e., $\vec{x}$ is specified. Next, the potential at the point is obtained as below by using Eq. 17.

In Eq. 17, when the contribution of the first term (n=0) to the potential $\psi(\vec{x})$ on the left side is expressed as $\psi|_{n=0}$, $$\psi|_{n=0} = -\phi \int_S dS' \{\psi(\vec{x}')\vec{n}' \cdot \nabla' G(\vec{x}, \vec{x}')\} \quad (18)$$

The contribution $\psi|_{n=0}$ of the first term is obtained by numerical analysis. Considering Eq. 14 together, Eq. 18 is expressed as $$(\psi|)_{n=0} = -\sum_{j=1}^{N} \left\{ \oint_{S_j} dS' \{\psi(\vec{x}')\vec{n}' \cdot \nabla' G(\vec{x}, \vec{x}')\} \right\} \quad (19)$$

Since the potential on the boundary S (specifically, $S_1$ to $S_N$) is known from the boundary condition and the same potential exists anywhere on a boundary in an electrostatic field, when potentials on the boundaries are expressed as $\psi_1, \ldots \psi_2, \ldots, \psi_i, \ldots, \psi_j, \ldots, \psi_N$, No Eq. 19 can be expressed as $$(\psi|)_{n=0} = -\sum_{j=1}^{N} \left\{ \oint_{S_j} dS' \{\psi_j \vec{n}' \cdot \nabla' G(\vec{x}, \vec{x}')\} \right\} \quad (20)$$

Considering that $\vec{x}'$ and the unit normal vector $\vec{n}'$ are obtained as numerical values, $\vec{x}$ is specified and the Green's function $G(\vec{x}, \vec{x}')$ is obtained from Eq. 7 (in a case of two dimensions), when the integrand is assumed $f_0(j, \vec{x}, \vec{x}')$ in Eq. 20, $$f_0(j, \vec{x}, \vec{x}') = -\psi_j \vec{n}' \cdot \nabla' G(\vec{x}, \vec{x}') \quad (21)$$

can be easily calculated.

In the numerical analysis of Eq. 20, since the integrand $f_0(j, \vec{x}, \vec{x}')$ of Eq. 21 can be easily obtained, the integrand $f_0(j, \vec{x}, \vec{x}')$ is integrated with respect to the boundary S by using MCM (Monte Carlo method). The reason why the Monte Carlo method is used is that it is easy to generate a random number with computer and it is possible to achieve a desired calculation accuracy by changing the number of generations of random numbers since the error of calculation is in proportion to the inverse of the square root of the number of generations of random numbers.

Each boundary $S_j$ is expressed being divided into boundary elements as shown in FIG. 2. Therefore, in the case of two dimensions, assuming that the total of lengths of lines of all the boundaries $S_1$ to $S_N$ is represented as $L_{total}$, the total length of line of the j-th boundary $S_j$ as $L_j$, the number of boundary elements that the j-th boundary $S_j$ has as $N_j$ and the length of line of the k-th boundary element $S_{jk}$ among the boundary elements that the j-th boundary $S_j$ has as $L_{jk}$, respectively, $L_{total}$ can be expressed as $$L_{total} = \sum_{j=1}^{N} L_j = \sum_{j=1}^{N} \sum_{k=1}^{N_j} L_{jk} \quad (22)$$

(in the case of three dimensions, the above length of line is replaced by area).

Figure 3:
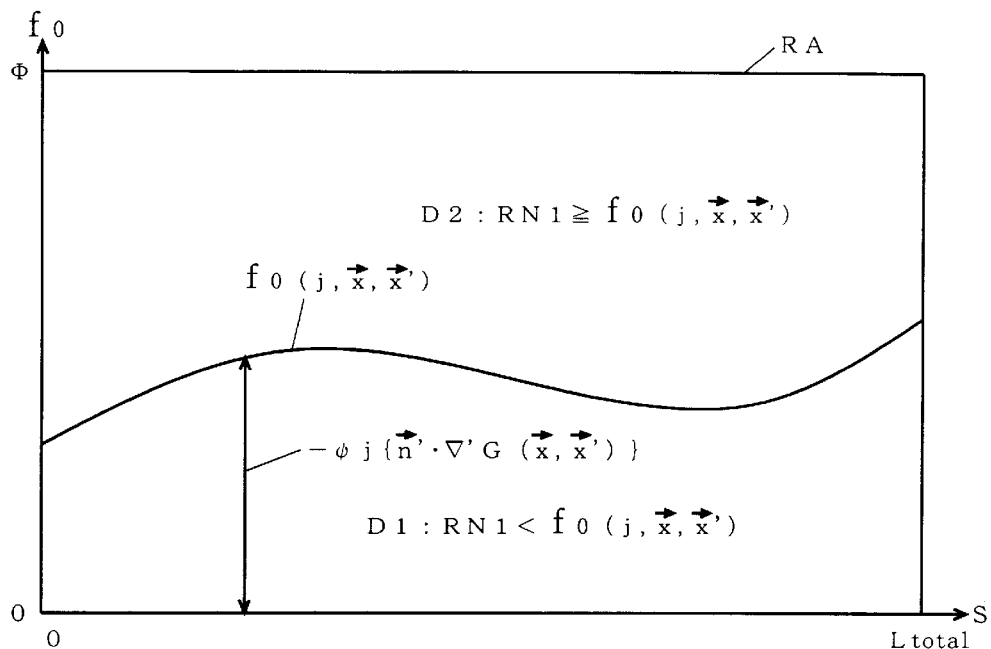
FIG. 3 illustrates a plane to which the Monte Carlo method is applied in accordance with the first preferred embodiment of the present invention.

To obtain the integrated value of the integrand $f_0(j, \vec{x}, \vec{x}')$ of Eq. 21, the integrand $f_0(j, \vec{x}, \vec{x}')$ is expressed on a plane $f_0$-S as shown in FIG. 3. The horizontal axis S of FIG. 3 is an alignment of the lengths of lines $L_{jk}$ of all the boundary elements $S_{jk}$ in the boundary S (specifically, boundaries $S_1$ to $S_N$), having a size of the total $L_{total}$ of lengths. The vertical axis $f_0$ shows the value of the integrand $f_0(j, \vec{x}, \vec{x}')$. The upper limit value $\Phi$ of the vertical axis $f_0$ is larger than an expected maximum value of the potential $\psi(\vec{x})$ to be obtained in the analysis space V and an appropriately-determined value (e.g., 10[V]) for using the Monte Carlo method. A rectangle having sides $\Phi$ and $L_{total}$ is represented as RA, and in the rectangle RA, a region of values smaller than the integrand $f_0(j, \vec{x}, \vec{x}')$ is represented as D1 and a region of values equal to or larger than the integrand $f_0(j, \vec{x}, \vec{x}')$ is represented as D2.

The principle of integral calculus by the Monte Carlo method is as follows. First, generated is such a random number RN1 as to choose a point inside the rectangle RA at random. Next, comparison between the random number RN1 and the integrand $f_0(j, \vec{x}, \vec{x}')$ is made to check if the random number RN1 is larger than the integrand $f_0(j, \vec{x}, \vec{x}')$. Specifically, it is judged whether the random number RN1 is located below the curb of the integrand $f_0(j, \vec{x}, \vec{x}')$ in FIG. 3. Only when the random number RN1 is located in the region D1, the integrated value W is incremented. Then, the random number RN1 is generated again and comparison between the random number RN1 and the integrand $f_0(j, \vec{x}, \vec{x}')$ is made, and only when the above condition is satisfied, the integrated value W is incremented. This is repeated M times.

If the number M of generations of random numbers is large enough, it is considered that the ratio of the integrated value W and the number M of generations of random numbers almost coincides with the area ratio of the region D1 and the region D1+D2. The ratio of W and M can be expressed as $$\frac{W}{M} \approx \frac{\sum_{j=1}^{N}\left\{\oint_{S_j} f_0(j, \vec{x}, \vec{x}')dS'\right\}}{L_{total}\Phi} \quad (23)$$

The numerator and the denominator of the right side represent the area of the region D1 and the area of the region D1+D2 (i.e., the rectangle RA), respectively. Therefore, transforming Eq. 23, $$\sum_{j=1}^{N}\left\{\oint_{S_j} f_0(j, \vec{x}, \vec{x}')dS'\right\} \approx \frac{W}{M} L_{total}\Phi \quad (24)$$

and the contribution $\psi|_{n=0}$ of the first term can be obtained by numerical analysis.

Further, generation of the random number RN1 is made as below. First, a random number RN2 is generated to choose one of all the boundary elements $S_{jk}$. At this time, probability $P_{jk}$ of choosing each boundary element $S_{jk}$ is given as;

$$P_{jk} = \frac{L_{jk}}{L_{total}} \quad (25)$$

in accordance to the length of line of the boundary element. This is an equivalent to choosing part of the horizontal axis S of FIG. 3 with weight added in accordance with the length of line $L_{jk}$ of the boundary element. Next, the random number RN1 is generated in a range of the upper limit $\Phi$ and 0. The random number RN1, unlike the random number RN2, is generated in a range of 0 to the upper limit $\Phi$ with no weight at uniform probability. This means choosing one point out of 0 to $\Phi$ of the vertical axis $f_0$ after choosing part of the horizontal axis S, and therefore means choosing one point inside the rectangle RA at random. Repeating this M times, the random numbers RN1 are uniformly distributed inside the rectangle RA.

Next, in a like manner, the contribution of the second term (n=1) to the potential $\psi(\vec{x})$ on the left side of Eq. 17 is obtained. When the contribution of the second term is represented as $\psi|_{n=1}$, $$\psi|_{n=1} = \quad (26)$$

$$-\oint_S dS' G(\vec{x}, \vec{x}')\vec{n}'\cdot\nabla'\left\{\sum_{j=1}^{N}\left\{\oint_{S_j} dS''\{\psi(\vec{x}'')\vec{n}''\cdot\nabla''G(\vec{x}',\vec{x}'')\}\right\}\right\}$$

is true. Since the vectors $\vec{x}$ and $\vec{x}'$ and the vector $\vec{x}''$ are independent, Eq. 26 can be expressed as $$\psi|_{n=1} = \quad (27)$$

$$-\oint_S dS' \sum_{j=1}^{N}\left\{\oint_{S_j} dS''\{G(\vec{x}, \vec{x}')\vec{n}'\cdot\nabla'\{\psi_j\vec{n}''\cdot\nabla''G(\vec{x}',\vec{x}'')\}\right\}$$

In Eq. 27, assuming the integrand to be $f_1(j, \vec{x}, \vec{x}', \vec{x}'')$, $$f_1(j, \vec{x}, \vec{x}', \vec{x}'') = -G(\vec{x}, \vec{x}')\vec{n}'\cdot\nabla'\{\psi_j\vec{n}''\cdot\nabla''G(\vec{x}', \vec{x}'')\} \quad (28)$$

The integrand $f_1(j, \vec{x}, \vec{x}', \vec{x}'')$ can be numerically calculated like the integrand $f_0(j, \vec{x}, \vec{x}')$.

Figure 4:
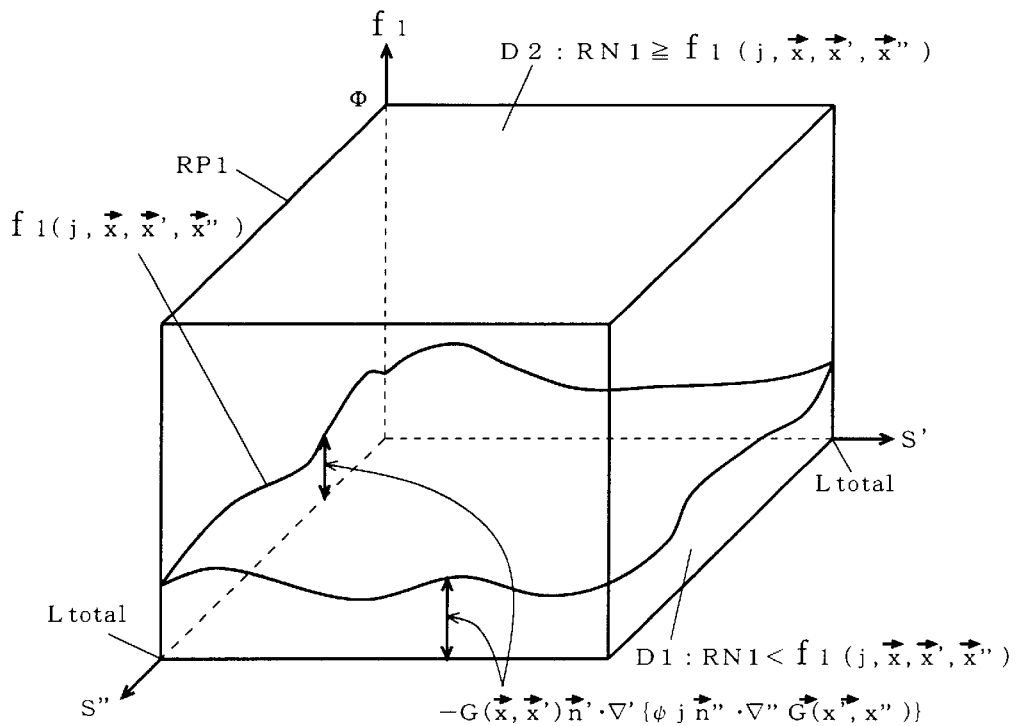
FIG. 4 illustrates a space to which the Monte Carlo method is applied in accordance with the first preferred embodiment of the present invention.

Since the integrand $f_1(j, \vec{x}, \vec{x}', \vec{x}'')$ can be indicated correspondingly to the boundary S like the integrand $f_0(j, \vec{x}, \vec{x}')$ but both $\vec{x}'$ and $\vec{x}''$ are variables of integration unlike the case of integrand $f_0(j, \vec{x}, \vec{x}')$, the integrand $f_1(j, \vec{x}, \vec{x}', \vec{x}'')$ has to be expressed on a space $f_1$–S'–S" as shown in FIG. 4. Since both the axes S' and S" show the boundary S inside the analysis space V from different view points, its maximum value is Ltotai of Eq. 22. The value of the integrand $f_1(j, \vec{x}, \vec{x}', \vec{x}'')$ is integrated with respect to the boundary S' and the total of the integrated values with respect to the boundary $S_j$ is integrated with respect to the boundary S", to obtain the contribution $\psi|_{n=1}$ of the second term. In other words, the value of the contribution $\psi|_{n=1}$ of the second term can be obtained by calculating the volume of the region D1 of FIG. 4.

The volume of the region D1 can be obtained by the Monte Carlo method like the value of the contribution $\psi|_{n=0}$ of the first term. In this case, since the space $f_1$–S'–S" is in three dimensions, it is necessary to generate another random number RN3, in addition to the random numbers RN1 and RN2, to choose one point inside a rectangular solid RP1 at random. Specifically, the random number RN2 for choosing one of the boundary elements S'$_{jk}$ in the boundary S' at the probability $P_{jk}$ is first generated, the random number RN3 for choosing one of the boundary elements S"$_{rs}$ in the boundary S" at the probability $P_{rs}$ is next generated, and finally the random number RN1 is generated in a range of the upper limit $\Phi$ and 0. Thus, one point can be chosen at random inside the rectangular solid RP1.

Next, comparison between the random number RN1 and the integrand $f_1(j, \vec{x}, \vec{x}', \vec{x}'')$ is made to check if the random number RN1 is smaller than the integrand $f_1(j, \vec{x}, \vec{x}', \vec{x}'')$, and only when the random number RN1 is found in the region D1, the integrated value W is incremented. This is repeated M times. If the number M of generations of random numbers is large enough, it is considered that the ratio of the integrated value W and the number M of generations of random numbers almost coincide with the volume ratio of the region D1 and the region D1+D2. The ratio of W and M can be expressed $$\frac{W}{M} \approx \frac{\oint_S dS' \sum_{j=1}^{N}\left\{\oint_{S_j} dS'' f_1(j, \vec{x}, \vec{x}', \vec{x}'')\right\}}{L_{total}L_{total}\Phi} \quad (29)$$

Transforming Eq. 29, $$\oint_S dS' \sum_{j=1}^{N}\left\{\oint_{S_j} dS'' f_1(j, \vec{x}, \vec{x}', \vec{x}'')\right\} \approx \frac{W}{M}(L_{total})^2\Phi \quad (30)$$

and thus the integral calculus of the integrand $f_1(j, \vec{x}, \vec{x}', \vec{x}'')$ with respect to the boundaries S' and S" can be made. Therefore, the contribution $\psi|_{n=1}$ of the second term can be obtained by numerical analysis.

On the analogy of the integrand $f_1(j, \vec{x}, \vec{x'}, \vec{x''})$, the contribution $\psi|_{n=m-1}$ of the m-th term (n=m−1) can be similarly obtained as below. The integrand $f_{m-1}(j, x^{(0)}, \ldots, x^{(m)})$ is defined as $$f_{m-1}(j,\vec{x^{(0)}},\ldots,\vec{x^{(m)}}) = G(\vec{x^{(0)}},\vec{x^{(1)}})\vec{n^{(1)}} \cdot \nabla^{(1)} \{G(\vec{x^{(1)}},\vec{x^{(2)}})\vec{n^{(2)}} \cdot$$
$$\nabla^{(2)} \{\ldots G(\vec{x^{(m-2)}},\vec{x^{(m-1)}})\vec{n^{(m-1)}} \cdot \nabla^{(m-1)}$$
$$\{\psi_j \nabla^{(m)} G(\vec{x^{(m-1)}},\vec{x^{(m)}}) \cdot \vec{n^{(m)}}\}\} \ldots \}\} \quad (31)$$

and comparison between the value of the integrand $f_{m-1}(j, \vec{x^{(0)}}, \ldots x^{(m)})$ and the last random number RN1 in choosing one point inside the (m+1)th-dimensional space at random is made to obtain the integrated value W. Then, the contribution $\psi|_{n=m-1}$ of the m-th term (n=m−1) can be obtained as $$\psi|_{n=m-1} \approx \frac{W}{M}(L_{total})^m \Phi \quad (32)$$

The above method is a so-called hit-or-miss Monte Carlo method, and when the definite integral is obtained by using the hit-or-miss Monte Carlo method, the error err of the integrated value $\psi|_{n=m-1}$ obtained correspondingly to a set of random numbers is defined as the square root of variance (that is, standard deviation) of the integrated value $\psi|_{n=m-1}$, being expressed as $$err = \sqrt{\frac{\Phi(L_{total})^m \psi|_{n=m-1} - \psi|_{n=m-1}^2}{M}} \quad (33)$$

It can be seen from Eq. 33 that the value of the error err depends on the number M of generations of random numbers. Therefore, the value of the error err is obtained at the same time as the contribution $\psi|_{n=m-1}$ of the m-th term is calculated, and for example, if the value of the error err falls within 5%, the value of the contribution $\psi|_{n=m-1}$ of the m-th term is determined, and if exceeds 5%, the number M of generations of random numbers is reset and the calculation is started again. Since the error of the contribution value $\psi|_{n=m-1}$ of the m-th term is thus checked, the contribution value $\psi|_{n=m-1}$ of the m-th term can be obtained with higher accuracy.

Thus, with respect to the infinite series of Eq. 17, the sum is obtained sequentially from the first term. Predetermining that the calculation is stopped when the value of contribution $\psi|_{n=m}$ of the (m+1)th term is equal to or smaller than, for example, 10% of the value of contribution $\psi|_{n=0}$ of the first term, addition of the contributions from the first term to the m-th term is made to obtain an approximate value of potential with accuracy to some degree. Further, since the amount of calculation can vary with the value of this ratio, it is possible to reduce the use of memory and calculation time, or to improve the accuracy of approximate value with an increase of calculation time.

The above is the calculation of potential at a $\vec{x}$, and as to other $\vec{x}$, the potential $\psi(\vec{x})$ at a given portion in the analysis space V can be obtained by the same calculation as above.

Though the above discussion has been made with reference to FIG. 2 taking the case of two dimensions, in the case of three dimensions, only calculation of the integrand $f_{m-1}(j, \vec{x^{(0)}}, \ldots x^{(m)})$ is changed and the principle is not changed, so it is natural that the present invention can be applied to the case of three dimensions.

Though the above calculation uses the Dirichlet's boundary condition, if the calculation uses a Neumann's boundary condition giving the normal differential of potential on the boundaries $S_1$ to $S_N$, instead of expansion of $\vec{n'} \cdot \nabla' \psi(\vec{x'})$ in Eq. 11, Eq. 15 may be substituted into the unknown letter $\psi(\vec{x'})$ on the right side and then expanded. In a case of boundary condition with the boundary given the potential and the boundary given the normal differential of potential mixed, the boundary S is divided into a boundary $S_D$ having the Dirichlet's boundary condition and a boundary $S_N$ having the Neumann's boundary condition as $$S = S_D + S_N \quad (34)$$

and expansion of series is performed for each boundary.

With the simulation method of this preferred embodiment, since the value of potential at a given portion inside the analysis space V is obtained, by using the boundary condition, as the sum of series from the first term to the m-th term in an expression where the function of potential is expanded into infinite series, the calculation can be stopped at such a term as to ensure the predetermined accuracy without changing the number of boundary elements for improvement in accuracy. Since the amount of calculation can be changed by arbitrarily setting the number of generations of random numbers, it is possible to gain the approximate value of potential to be obtained with less number of generations of random numbers, less use of memory and less amount of calculation time. On the other hand, it is also possible to improve the accuracy of approximate value with more number of generations of random numbers and more amount of calculation time.

Though this preferred embodiment has been discussed taking a potential as a physical quantity, since temperature, for example, is a physical quantity satisfying the Poisson's equation, the value of temperature at a given portion inside the analysis space V can be obtained by the same method as above.

The Second Preferred Embodiment

This preferred embodiment has an object of obtaining the parasitic capacitance $C_{i,j}$ between the conductor $V_i$ and the conductor $V_j$ when the regions $V_1$ to $V_N$ of FIG. 1 are regarded as a conductor. Herein, it is assumed, for simple discussion, that the charge density $\rho$ in a region other than the regions $V_1$ to $V_N$ inside the analysis space V is 0, and the Dirichlet's boundary condition is given, like in the first preferred embodiment. It is also assumed, like in the first preferred embodiment, that the discussion is based on the two-dimensional view of FIG. 2 and the dielectric constant $\in$ in the dielectric region DR1 is constant.

From the Gauss' law, the amount of electric charges $Q_i$ that the conductor $V_i$ has is expressed as $$Q_i = -\phi \int_{S_i} dS \{\vec{n} \cdot \in \nabla \psi(\vec{x})\} \quad (35)$$

Substituting Eq. 17 into Eq. 35, $$Q_i = \quad (36)$$
$$-\oint_{S_i} dS^{(0)} \{\vec{n^{(0)}} \cdot \varepsilon \nabla^{(0)} \{-\oint_{S_i} d\,S^{(1)} \{\psi(\vec{x^{(1)}})\vec{n^{(1)}} \cdot \nabla^{(1)} G(\vec{x^{(0)}}, \vec{x^{(1)}})\} -$$
$$\sum_{n=1}^{x} \{\oint_S dS^{(1)} \{G(\vec{x^{(0)}}, \vec{x^{(1)}})\vec{n^{(1)}} \cdot$$

-continued $$\nabla^{(1)}\left\{\cdots\left\{\oint_S dS^{(n)}\left\{G\left(\overrightarrow{x^{(n-1)}},\overrightarrow{x^{(n)}}\right)\overrightarrow{n^{(n)}}\right.\right.\right.$$

$$\nabla^{(n)}\left\{\oint_S dS^{(n+1)}\left\{\psi(\overrightarrow{x^{(n+1)}})\nabla^{(n+1)} G\left(\overrightarrow{x^{(n)}},\right.\right.\right.$$

$$\left.\left.\left.\overrightarrow{x^{(n+1)}}\right)\cdot\overrightarrow{n^{(n+1)}}\right\}\right\}\cdots\right\}$$

Considering Eq. 14 and the boundary condition together, Eq. 36 is expressed as $$Q_i = \oint_{S_i} dS^{(0)}\left\{\varepsilon\overrightarrow{n^{(0)}}\cdot\nabla^{(0)}\left\{\sum_{j\ne 1}\oint_{S_j} dS^{(1)}\left\{\psi_j\overrightarrow{n^{(1)}}\cdot\nabla^{(1)} G\left(\overrightarrow{x^{(0)}},\overrightarrow{x^{(1)}}\right)\right\}\right.\right. + \quad (37)$$

$$\oint_{S_i} dS^{(1)}\left\{\psi_i\overrightarrow{n^{(1)}}\cdot\nabla^{(1)} G\left(\overrightarrow{x^{(0)}},\overrightarrow{x^{(1)}}\right)\right\} +$$

$$\sum_{n=1}^{x}\left\{\oint_S dS^{(1)}\left\{G\left(\overrightarrow{x^{(0)}},\overrightarrow{x^{(1)}}\right)\overrightarrow{n^{(1)}}\cdot\right.\right.$$

$$\nabla^{(1)}\left\{\cdots\left\{\oint_S dS^{(n)}\left\{G\left(\overrightarrow{x^{(n-1)}},\overrightarrow{x^{(n)}}\right)\overrightarrow{n^{(n)}}\right.\right.\right.$$

$$\nabla^{(n)}\left\{\sum_{j\ne 1}\oint_{S_j} dS^{(n+1)}\left\{\psi_j\nabla^{(n+1)} G\left(\overrightarrow{x^{(n)}},\right.\right.\right.$$

$$\left.\left.\overrightarrow{x^{(n+1)}}\right)\cdot\overrightarrow{n^{(n+1)}}\right\} +$$

$$\oint_{S_i} dS^{(n+1)}\left\{\psi_i\nabla^{(n+1)} G\left(\overrightarrow{x^{(n)}},\right.\right.$$

$$\left.\left.\left.\left.\overrightarrow{x^{(n+1)}}\right)\cdot\overrightarrow{n^{(n+1)}}\right\}\right\}\cdots\right\}$$

Therefore, from Eq. 13, the parasitic capacitance $C_{i,j}$ can be expressed as $$C_{i,j} = \frac{\partial Q_i}{\partial \psi_j} = \oint_{S_i} dS^{(0)}\left\{\varepsilon\overrightarrow{n^{(0)}}\cdot\nabla^{(0)}\left\{\oint_{S_j} dS^{(1)}\left\{\overrightarrow{n^{(1)}}\cdot\nabla^{(1)} G\left(\overrightarrow{x^{(0)}},\overrightarrow{x^{(1)}}\right)\right\}\right.\right. + \quad (38)$$

$$\sum_{n=1}^{\infty}\left\{\oint_S dS^{(1)}\left\{G\left(\overrightarrow{x^{(0)}},\overrightarrow{x^{(1)}}\right)\overrightarrow{n^{(1)}}\cdot\right.\right.$$

$$\nabla^{(1)}\left\{\cdots\left\{\oint_S dS^{(n)}\left\{G\left(\overrightarrow{x^{(n-1)}},\overrightarrow{x^{(n)}}\right)\overrightarrow{n^{(n)}}\right.\right.\right.$$

$$\nabla^{(n)}\left\{\oint_{S_j} dS^{(n+1)}\left\{\nabla^{(n+1)} G\left(\overrightarrow{x^{(n)}},\right.\right.\right.$$

$$\left.\left.\left.\left.\overrightarrow{x^{(n+1)}}\right)\cdot\overrightarrow{n^{(n+1)}}\right\}\right\}\cdots\right\}$$

Like in the first preferred embodiment, assuming the contribution of the m-th term of Eq. 38 to be $C_{i,j}|_{n=m-1}$, the values of contributions are sequentially obtained and the obtained values are added.

For example, to obtain the value of contribution $C_{i,j}|_{n=0}$ of the first term, $$C_{i,j}|_{n=0}=\phi\int_{S_i}dS\{\in \overrightarrow{n}\cdot\nabla\{\phi\int_{S_j}dS'\{\overrightarrow{n'}\cdot\nabla'G(\overrightarrow{x},\overrightarrow{x'})\}\}\} \quad (39)$$

should be calculated. It is noted that Eq. 39 has a structure similar to that of Eq. 26 with respect to the contribution $\psi|_{n=1}$ of the second term in the first preferred embodiment.

Figure 5:
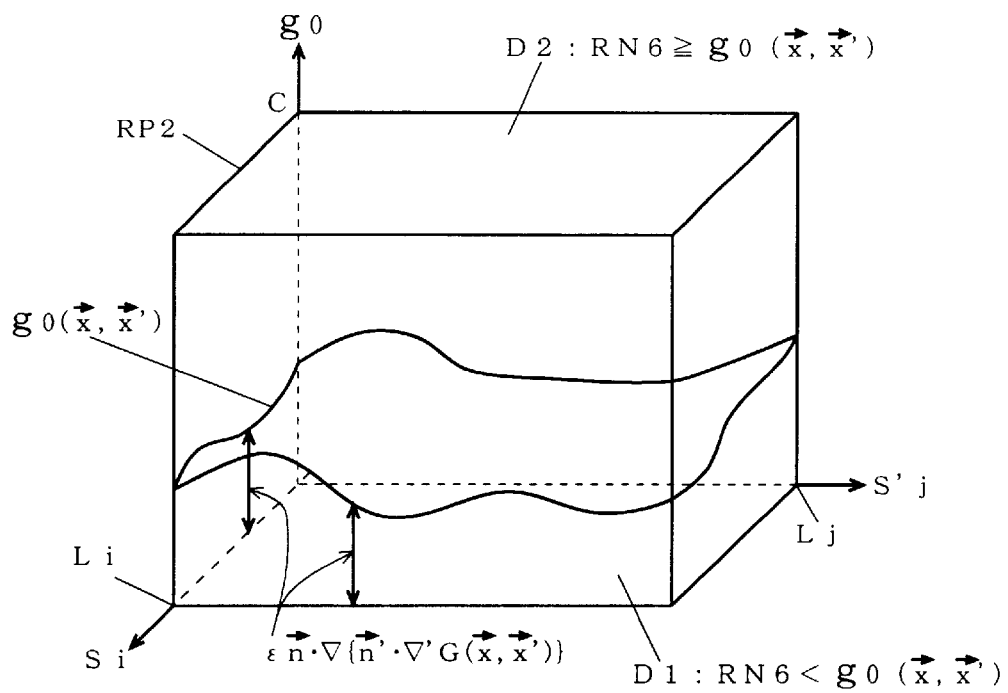
FIG. 5 illustrates a space to which the Monte Carlo method is applied in accordance with the second preferred embodiment of the present invention.

Therefore, referring to the integrand $f_{m-1}(j,\overrightarrow{x^{(0)}},\ldots,\overrightarrow{x^{(m)}})$ like the calculation of the contribution $\psi|_{n=1}$ of the second term, the integrand $g_0(\overrightarrow{x},\overrightarrow{x'})$ is defined as $$g_0(\overrightarrow{x},\overrightarrow{x'})=\in \overrightarrow{n}\cdot\nabla 55\ \overrightarrow{n'}\cdot\nabla'G(\overrightarrow{x},\overrightarrow{x'})\} \quad (40)$$

considering a space $g_0$–$S_i$–$S'_j$ as shown in FIG. 5.

In FIG. 5, the axis represented as $g_0$ is an axis indicating the values of the integrand $g_0(\overrightarrow{x},\overrightarrow{x'})$ and its upper limit C is larger than the maximum value of the parasitic capacitance $C_{i,j}$ to be obtained inside the analysis space V and is a value appropriately determined for using the Monte Carlo method. The axis represented as $S'_j$ is an alignment of the line lengths $L'_{jk}$ of the boundary elements $S'_{jk}$ on any boundary $S'_j$ among the boundaries $S'_1$ to $S'_N$ with respect to $\overrightarrow{x'}$ except the boundary $S'_i$ and its maximum value $L_j$ is a total length of the boundary $S'_j$. The axis represented as $S_i$ is an alignment of line lengths $L_{ik}$ of the boundary elements $S_{ik}$ on the boundary $S_i$ with respect to $\overrightarrow{x}$ and its maximum value $L_i$ is a total length of the boundary $S_i$. Therefore, the value of the contribution $C_{i,j}|_{n=0}$ can be obtained by calculating the volume of the region D1 inside a rectangular solid RP2 in the space $g_0$–$S_i$–$S'_j$.

The volume of the region D1 can be obtained by the Monte Carlo method like the contribution $\psi|_{n=1}$ of the second term in the first preferred embodiment. Specifically, a random number RN4 is first generated, which is used for choosing one of the boundary elements $S_{ik}$ on the boundary $S_i$ at a probability $P_{ik}$ which is defined as $$P_{ik} = \frac{L_{ik}}{L_i} \quad (41)$$

Next, a random number RN5 is generated, which is used for choosing one of the boundary elements $S'_{jk}$ on the boundary $S'_j$ at a probability $P'_{jk}$ which is defined as $$P'_{jk} = \frac{L_{jk}}{L_j} \quad (42)$$

(where $j\ne i$)

Finally, a random number RN6 is generated, which ensures a uniform probability in a range of the upper limit C and 0. Thus, one point inside the rectangular solid RP2 is chosen at random.

Next, comparison between the random number RN6 and the integrand $g_0(\overrightarrow{x},\overrightarrow{x'})$ is made to check if the random number RN6 is smaller than the integrand $g_0(\overrightarrow{x},\overrightarrow{x'})$, and only when the random number RN6 is located in the region D1, the integrated value W is incremented. This is repeated M times. If the number M of generations of random numbers is large enough, it is considered that the ratio of the integrated value W and the number M of generations of random numbers almost coincide with the volume ratio of the region D1 and the region D1+D2. The ratio of W and M can be expressed as $$\frac{W}{M} \approx \frac{\oint_{S_i} dS\left\{\oint_{S_j} dS' g_0(\overrightarrow{x},\overrightarrow{x'})\right\}}{L_i L_j C} \quad (43)$$

Transforming Eq. 43, $$\oint_{S_j} dS \left\{ \oint_{S_j} dS' g_0(\vec{x}, \vec{x}') \right\} \approx \frac{W}{M} L_i L_j C \qquad (44)$$

and the integral calculus of the integrand $g_0(\vec{x}, \vec{x}')$ can be performed. Thus, the value of the contribution $C_{i,j}|_{n=0}$ of the first term can be obtained by numerical analysis.

Similarly, the contribution $C_{i,j}|_{n=m-1}$ of the m-th term (n=m−1) can be obtained as below. The integrand $g_{m-1}(\vec{x}^{(0)}, \ldots, \vec{x}^{(m)})$ is defined as $$g_{m-1}\left(\vec{x}^{(0)}, \ldots, \vec{x}^{(m)}\right) = \qquad (45)$$

$$\varepsilon \vec{n}^{(0)} \cdot \nabla^{(0)} \left\{ G\left(\vec{x}^{(0)}, \vec{x}^{(1)}\right) \vec{n}^{(1)} \cdot \nabla^{(1)} \left\{ \ldots \left\{ G\left(\vec{x}^{(m-2)}, \vec{x}^{(m-1)}\right) \right. \right. \right.$$

$$\left. \left. \left. \vec{n}^{(m-1)} \cdot \nabla^{(m-1)} \left\{ \vec{n}^{(m)} \cdot \nabla^{(m)} G\left(\vec{x}^{(m-1)}, \vec{x}^{(m)}\right) \right\} \right\} \ldots \right\} \right\}$$

and comparison is made between the value of the integrand $g_{m-1}(\vec{x}^{(0)}, \ldots, \vec{x}^{(m)})$ and the last random number RN6 when one point inside a (m+1)th-dimensional space is chosen at random, to obtain the integrated value W. Then the contribution $C_{i,j}|_{n=m-1}$ of the m-th term is obtained as $$C_{i,j}|_{n=m-1} \approx \frac{W}{M} L_i L_j L_{total}^{m-1} C \qquad (46)$$

Further, like in the first preferred embodiment, the error value is obtained at the same time as the contribution $C_{i,j}|_{n=m-1}$ of the m-th term is calculated, and if the error value falls within a certain value, the value of the contribution $C_{i,j}|_{n=m-1}$ of the m-th term is determined, and if exceeds the certain value, the number M of generations of random numbers is reset and the calculation is started again. Since the error of the contribution value $C_{i,j}|_{n=m-1}$ of the m-th term is thus checked, the contribution value $C_{i,j}|_{n=m-1}$ of the m-th term can be obtained with higher accuracy.

Furthermore, like in the first preferred embodiment, predetermining that the calculation is stopped when the value of contribution $C_{i,j}|_{n=m-1}$ of the (m+1)th term is equal to or smaller than a certain ratio of the value of contribution $C_{i,j}|_{n=0}$ of the first term, addition of the contributions from the first term to the m-th term is made to obtain an approximate value of parasitic capacitance with accuracy to some degree. Further, since the amount of calculation can vary with the value of this ratio, it is possible to reduce the use of memory and calculation time, or to improve the accuracy of approximate value with an increase of calculation time.

In the case of three dimensions, like in the first preferred embodiment, only calculation of the integrand $g_{m-1}(\vec{x}^{(0)}, \ldots, \vec{x}^{(m)})$ is changed and the principle is not changed, so it is natural that the present invention can be applied to the case of three dimensions.

Further, like in the first preferred embodiment, the present invention can be applied not only to the Dirichlet's boundary condition but also to the Neumann's boundary condition and the mixed boundary condition.

With the simulation method of this preferred embodiment, since the value of parasitic capacitance between the conductors inside the analysis space V is obtained, by using the boundary condition, as the sum of series from the first term to the m-th term in an expression where the function of parasitic capacitance is expanded into infinite series, it is possible to ensure a predetermined accuracy with an increase in the number of terms without changing the number of boundary elements for improvement in accuracy. Since the amount of calculation can be changed by arbitrarily setting the number of generations of random numbers, it is possible to gain the approximate value of parasitic capacitance to be obtained with less number of generations of random numbers, less use of memory and less amount of calculation time. On the other hand, it is possible to improve the accuracy of approximate value with more number of generations of random numbers and more amount of calculation time. Moreover, it is possible to obtain the parasitic capacitance without obtaining the potential.

The Third Preferred Embodiment

Figure 6:
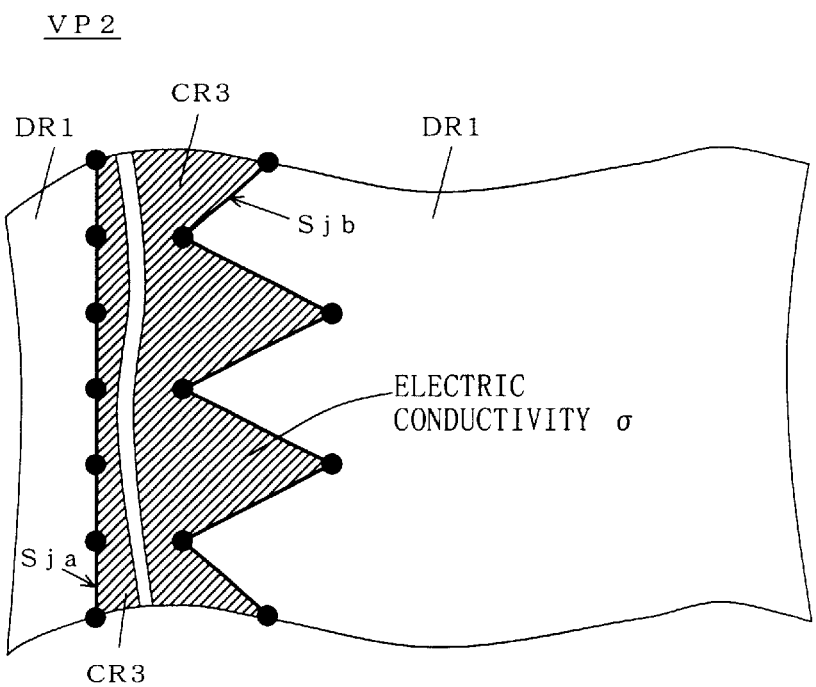
FIG. 6 illustrates part of the analysis space in accordance with the third preferred embodiment of the present invention.

This preferred embodiment has an object of obtaining a parasitic resistance in a conductor region CR3 when a current is applied to the conductor region CR3 in the two-dimensional view of FIG. 6. FIG. 6 is an enlarged view of a partial region VP2 in the analysis space V of the model view of FIG. 1. The conductor region CR3 has the boundary $S_j$ and is separated thereby from the dielectric region DR1. The boundary $S_j$ consists of partial boundaries $S_{ja}$ and $S_{jb}$. The conductor region CR3 has a constant electric conductivity σ. The node ● is regarded as a representative point of boundary elements and is given positional (coordinate) information and information on a boundary condition. When a current flows in the conductor region CR3, though the conductor has a potential distribution since it is not an electrostatic field, the potential difference between the boundary elements in the partial boundary $S_{ja}$ and that between the boundary elements in the partial boundary $S_{jb}$ are each so much smaller than that between the partial boundaries $S_{ja}$ and $S_{jb}$, being negligible. Therefore, all the boundary elements of the partial boundary $S_{ja}$ are given the potential $\psi_{ja}$ as a boundary condition and all the boundary elements of the partial boundary $S_{jb}$ are given the potential $\psi_{jb}$ as a boundary condition (Dirichlet's boundary condition).

The parasitic resistance $R_{jab}$ between the partial boundaries $S_{ja}$ and $S_{jb}$ in the conductor region CR3 is obtained as below. It is herein assumed that a current $I_{jab}$ flows into the conductor region CR3 through the partial boundary $S_{ja}$ and the same current $I_{jab}$ flows out of the conductor region CR3 through the partial boundary $S_{jb}$, and the current $I_{jab}$ is a constant current.

To obtain the parasitic resistance in the conductor, the equation of continuance of current as $$div \vec{J} = -\frac{\partial \rho}{\partial t} \qquad (47)$$

and the equation defining the electric field and current density as $$\vec{J} = \sigma \vec{E} = -\sigma \operatorname{grad} \psi \qquad (48)$$

are used where $\vec{J}$, ρ, t, σ, $\vec{E}$ and ψ represent a current density vector, a charge density, a time, an electric conductivity, an electric field vector and a potential, respectively.

Since the current $I_{jab}$ flows in through the partial boundary $S_{ja}$ and all the current $I_{jab}$ flows out through the partial boundary $S_{jb}$, the right side of Eq. 47 is 0. Therefore, from Eqs. 47 and 48, ψ satisfies the Laplace's equation and Eq. 11 is true for the potential ψ in the conductor region CR3. The vector $\vec{x}'$ of Eq. 11 is a position vector on the boundary S, like in the first and second preferred embodiments.

The current $I_{jab}$ can be expressed as a line integral (in the case of three dimensions, a surface integral) of the current density in a surface where the current flows in or out, as $$I_{jab} = \int_{S_{ja}} dS \vec{n} \cdot \vec{J} = \int_{S_{jb}} dS \vec{n} \cdot \vec{J} \tag{49}$$

Substituting Eq. 48 into Eq. 49, $$I_{jab} = \int_{S_{ja}} dS \vec{n} \cdot \{-\sigma \nabla \psi(\vec{x})\} \tag{50}$$

Therefore, like in the first and second preferred embodiments, expanding the normal differential $\vec{n} \cdot \nabla \psi(\vec{x})$ of potential which is unknown by using Eq. 17, Eq. 50 can be expressed as $$I_{jab} = \tag{51}$$

$$-\sigma \int_{S_{ja}} dS^{(0)} \overrightarrow{n^{(0)}} \cdot \nabla^{(0)} \left\{ -\oint_S dS^{(1)} \{\psi(\overrightarrow{x^{(1)}}) \overrightarrow{n^{(1)}} \cdot \nabla^{(1)} G(\overrightarrow{x^{(0)}}, \overrightarrow{x^{(1)}}) \} \right\} -$$

$$\sum_{n=1}^{\infty} \left\{ \oint_S dS^{(1)} \{ G(\overrightarrow{x^{(0)}}, \overrightarrow{x^{(1)}}) \overrightarrow{n^{(1)}} \cdot \nabla^{(1)} \{ \cdots \{ \oint_S dS^{(n)} \right.$$

$$\{ G(\overrightarrow{x^{(n-1)}}, \overrightarrow{x^{(n)}}) \overrightarrow{n^{(n)}} \cdot \nabla^{(n)} \{ \oint_S dS^{(n+1)}$$

$$\{ \psi(\overrightarrow{x^{(n+1)}}) \nabla^{(n+1)} G(\overrightarrow{x^{(n)}}, \overrightarrow{x^{(n+1)}}) \cdot$$

$$\overrightarrow{n^{(n+1)}} \} \} \cdots \} \}$$

Defining the integrand $h_{m-1}(\vec{x}^{(0)}, \ldots, \vec{x}^{(m)})$ as $$h_{m-1}(\overrightarrow{x^{(0)}}, \ldots, \overrightarrow{x^{(m)}}) = \sigma \overrightarrow{n^{(0)}} \cdot \nabla^{(0)} \{ G(\overrightarrow{x^{(0)}}, \overrightarrow{x^{(1)}}) \overrightarrow{n^{(1)}} \cdot$$

$$\nabla^{(1)} \{ \cdots \{ G(\overrightarrow{x^{(m-2)}}, \overrightarrow{x^{(m-1)}}) \overrightarrow{n^{(m-1)}} \cdot \nabla^{(m-1)}$$

$$\{\psi(\overrightarrow{x^{(m)}}) \overrightarrow{n^{(m)}} \cdot \nabla^{(m)} G(\overrightarrow{x^{(m-1)}}, \overrightarrow{x^{(m)}}) \} \} \cdots \} \} \tag{52}$$

the value of the integrand $h_{m-1}(\vec{x}^{(0)}, \ldots, \vec{x}^{(m)})$ is integrated by using the Monte Carlo method in the (m+1)th-dimensional space with respect to the boundaries $S^{(0)}, \ldots, S^{(m)}$ and an appropriate upper limit, to obtain the contribution $I_{jab}|_{n=m-1}$. Further, the error value is obtained at the same time as the contribution $I_{jab}|_{n=m-1}$ of the m-th term is calculated, and if the error value falls within a certain value, the value of the contribution $I_{jab}|_{n=m-1}$ of the m-th term is determined, and if exceeds the certain value, the number M of generations of random numbers is reset and the calculation is started again.

Furthermore, predetermining that the calculation is stopped when the value of contribution $I_{jab}|_{n=m}$ of the (m+1)th term is equal to or smaller than a certain ratio of the value of contribution $I_{jab}|_{n=0}$ of the first term, addition of the contributions from the first term to the m-th term is made to obtain an approximate value of current $I_{jab}$ with accuracy to some degree.

Using the current $I_{jab}$ thus obtained together with the potentials $\psi_{ja}$ and $\psi_{jb}$ as the boundary condition, the value of the parasitic resistance $R_{jab}$ can be obtained as $$R_{jab} = \frac{\psi_{ja} - \psi_{jb}}{I_{jab}} \tag{53}$$

Further, like in the first and second preferred embodiments, the present invention can be also applied to the case of three dimensions and the case where the Neumann's boundary condition or the mixed boundary condition is given as a boundary condition.

With the simulation method of this preferred embodiment, it is possible to obtain more accurate value of the parasitic resistance $R_{jab}$ in consideration of the potential distribution while producing the same effect as the second preferred embodiment. Moreover, it is possible to directly obtain the parasitic resistance without obtaining the potential distribution.

The Fourth Preferred Embodiment

Figure 7:
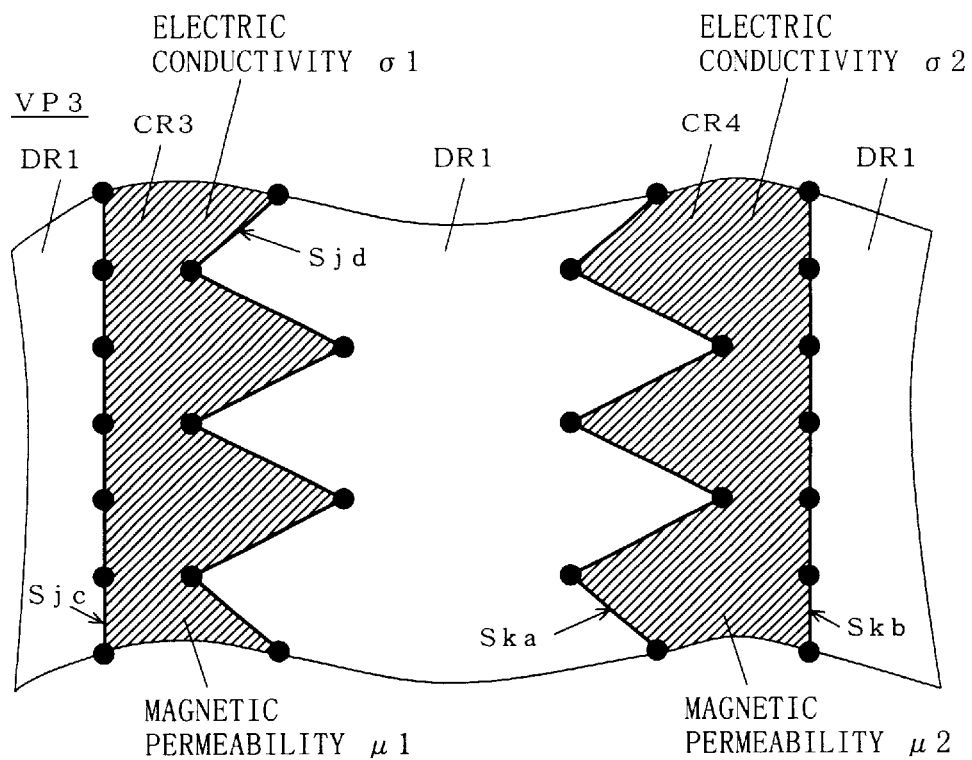
FIG. 7 illustrates part of the analysis space in accordance with the fourth preferred embodiment of the present invention.

This preferred embodiment has an object of obtaining a parasitic self-inductance of the conductor region CR3 when a current is applied to the conductor region CR3 or a parasitic mutual inductance of the conductor region CR3 when a current is applied to the conductor region CR3 and a conductor region CR4 in the view of FIG. 7. FIG. 7 is an enlarged view of a partial region VP3 in the analysis space V of the model view of FIG. 1. The conductor region CR3 has the boundary $S_j$ and is separated thereby from the dielectric region DR1. The boundary $S_j$ consists of partial boundaries $S_{jc}$ and $S_{jd}$. The conductor region CR4 has the boundary $S_k$ and is separated thereby from the dielectric region DR1. The boundary Sk consists of partial boundaries $S_{ka}$ and $S_{kb}$. The conductor region CR3 has a constant electric conductivity σ1 and a constant magnetic permeability μ1. The conductor region CR4 has a constant electric conductivity σ2 and a constant magnetic permeability μ2. The node ● is regarded as a representative point of boundary elements and is given positional information and information on a boundary condition. When a current flows in the conductor regions CR3 and CR4, though the conductor has a potential distribution since it is not an electrostatic field, the potential difference between the boundary elements in the partial boundary $S_{jc}$ and that between the boundary elements in the partial boundary $S_{jd}$ are each so much smaller than that between the partial boundaries $S_{jc}$ and $S_{jd}$, being negligible. Similarly, the potential difference between the boundary elements in the partial boundary $S_{ka}$ and that between the boundary elements in the partial boundary $S_{kb}$ are each so much smaller than that between the partial boundaries $S_{ka}$ and $S_{kb}$, being negligible. Therefore, all the boundary elements of the partial boundary $S_{jc}$ are given the potential $\psi_{jc}$ as a boundary condition, all the boundary elements of the partial boundary $S_{jd}$ are given the potential $\psi_{jd}$ as a boundary condition, all the boundary elements of the partial boundary $S_{ka}$ are given the potential $\psi_{ka}$ as a boundary condition, and all the boundary elements of the partial boundary $S_{kb}$ are given the potential $\psi_{kb}$ as a boundary condition, (Dirichlet's boundary condition).

Next, study will be made on obtaining a parasitic self-inductance $L_{j,j}$ by a current $I_j$ flowing in the conductor region CR3, i.e., the region $V_j$, or a parasitic mutual inductance $L_{j,k}$ by the current $I_j$ flowing in the region $V_j$ and a current $I_k$ flowing in the conductor region CR4, i.e., a region $V_k$.

In FIG. 7, it is assumed that a current $I_{jcd}$ flows into the conductor region CR3 through the partial boundary $S_{jc}$ and the same current $I_{jcd}$ flows out of the conductor region CR3 through the partial boundary $S_{jd}$, and the current $I_{jcd}$ is a constant current. It is further assumed that a current $I_{kab}$ flows into the conductor region CR4 through the partial boundary $S_{ka}$ and the same current $I_{kab}$ flows out of the conductor region CR4 through the partial boundary $S_{kb}$, and the current $I_{kab}$ is a constant current. Then, Eq. 11 is also true for the potential $\psi$ inside the conductor regions CR3 and CR4.

An energy $W_m$ by magnetic field at a position represented by $\vec{x}$ is expressed as $$W_m = \frac{1}{2} \int_{V_j} dV \vec{A}(\vec{x}) \cdot \vec{J}(\vec{x}) \tag{54}$$

where dV, $\vec{A}(\vec{x})$ and $\vec{J}(\vec{x})$ represent a variable of integration, a vector potential and a current density vector, respectively.

A relation between the vector potential and the current density vector is expressed as $$\vec{A}(\vec{x}) = \frac{\mu}{4\pi} \int_{V_k} dV' \frac{\vec{J}(\vec{x}')}{|\vec{x} - \vec{x}'|} \tag{55}$$

$$= \mu \int_{V_k} dV' G(\vec{x}, \vec{x}') \vec{J}(\vec{x}')$$

where $\mu$, $G(\vec{x}, \vec{x}')$, $\vec{x}'$ and dV' represent a magnetic permeability at $\vec{x}$, a Green's function, a position vector indicating the inside of a conductor region where the current density vector exists and a variable of integration in the region $V_k$ where $\vec{x}'$ exists, respectively. The reason why the integrals in the conductor regions $V_j$ and $V_k$, instead of the whole analysis region V, are used is that the vector potential A is not influenced by a portion where the current density vector $\vec{J}$ is 0. The vector $\vec{x}'$ is a vector also indicating the inside of the conductor region, different from that used in the first to third preferred embodiment, indicating a position on the boundary S.

A relation between the energy $W_m$ by the magnetic field and the parasitic mutual inductance $L_{j,k}$ is expressed as $$W_m = \frac{1}{2} L_{j,k} I_j I_k \tag{56}$$

(if k=j, $L_{j,j}$ represents the parasitic self-inductance). The values of the currents $I_j$ and $I^k$ can be obtained from the third preferred embodiment.

Using Eqs. 48 and 56 together, Eq. 54 can be transformed into $$L_{j,k} = \frac{1}{I_j I_k} \int_{V_k} dV \left\{ \mu \int_{V_k} dV' G(\vec{x}, \vec{x}') \vec{J}(\vec{x}') \right\} \cdot \vec{J}(\vec{x}) \tag{57}$$

$$= \frac{\mu}{I_j I_k} \int_{V_j} dV \int_{V_k} dV' \left\{ G(\vec{x}, \vec{x}') \sigma a \nabla' \psi(\vec{x}') \right\} \cdot \sigma b \nabla \psi(\vec{x})$$

where σa and σb represent an electric conductivity at $\vec{x}'$ and an electric conductivity at $\vec{x}$, respectively. In FIG. 7, when the parasitic mutual inductance is obtained, $\mu=\mu 1$, σa=σ2 and σb=σ1 since attention is directed to the conductor regions CR3 and CR4. When the parasitic self-inductance is obtained, $\mu=\mu 1$, σa=σb=σ1 since attention is directed only to the conductor region CR3.

Therefore, like in the first to third preferred embodiments, expanding the unknown letters $\nabla'\psi(\vec{x}')$ and $\nabla\psi(\vec{x})$ by using Eq. 17, Eq. 57 can be expressed as $$L_{j,k} = \frac{\mu}{I_j I_k} \int_{V_j} dV^{(0)} \int_{V_k} dV^{(1)} \Big\{ G\big(\overrightarrow{x^{(0)}}, \tag{58}$$

$$\overrightarrow{x^{(1)}}\big) \sigma a \nabla^{(1)} \Big\{ -\oint_S dS^{(2)} \Big\{ \psi(\overrightarrow{x^{(2)}}) \overrightarrow{n^{(2)}} \cdot$$

$$\nabla^{(2)} G\big(\overrightarrow{x^{(1)}}, \overrightarrow{x^{(2)}}\big) \Big\} -$$

$$\sum_{n=1}^{\infty} \Big\{ \oint_S dS^{(2)} \Big\{ G\big(\overrightarrow{x^{(1)}}, \overrightarrow{x^{(2)}}\big) \overrightarrow{n^{(2)}} \cdot \nabla^{(2)} \Big\{ \cdots$$

$$\Big\{ \oint_S dS^{(n+1)} \Big\{ G\big(\overrightarrow{x^{(n)}}, \overrightarrow{x^{(n+1)}}\big) \overrightarrow{n^{(n+1)}} \cdot$$

$$\nabla^{(n+1)} \Big\{ \oint_S dS^{(n+2)} \Big\{ \psi(\overrightarrow{x^{(n+2)}}) \nabla^{(n+2)} G\big(\overrightarrow{x^{(n+1)}},$$

$$\overrightarrow{x^{(n+2)}}\big) \cdot \overrightarrow{n^{(n+2)}} \Big\} \Big\} \cdots \Big\} \Big\} \Big\} \cdot$$

$$\sigma b \nabla^{(0)} \Big\{ -\oint_S dS^{(1)} \Big\{ \psi(\overrightarrow{x^{(1)}}) \overrightarrow{n^{(1)}} \cdot$$

$$\nabla^{(1)} G\big(\overrightarrow{x^{(0)}}, \overrightarrow{x^{(1)}}\big) \Big\} -$$

$$\sum_{n=1}^{\infty} \Big\{ \oint_S dS^{(1)} \Big\{ G\big(\overrightarrow{x^{(0)}},$$

$$\overrightarrow{x^{(1)}}\big) \overrightarrow{n^{(1)}} \cdot \nabla^{(1)} \Big\{ \cdots$$

$$\Big\{ \oint_S dS^{(n)} \Big\{ G\big(\overrightarrow{x^{(n-1)}}, \overrightarrow{x^{(n)}}\big) \overrightarrow{n^{(n)}} \cdot$$

$$\nabla^{(n)} \Big\{ \oint_S dS^{(n+1)} \Big\{ \psi(\overrightarrow{x^{(n+1)}}) \nabla^{(n+1)} G\big(\overrightarrow{x^{(n)}},$$

$$\overrightarrow{x^{(n+1)}}\big) \cdot \overrightarrow{n^{(n+1)}} \Big\} \Big\} \cdots \Big\}$$

It is noted that the vector $\vec{x}'$ with respect to the unknown letter $\nabla'\psi(\vec{x}')$ is a vector also indicating the inside of the conductor region while the vector $\vec{x}'$ which appears as the result of expansion of the unknown letter $\nabla\psi(\vec{x})$ is a vector only indicating a boundary portion, i.e., a surface of the conductor region.

Therefore, defining the integrand $O_{m-1}(\overrightarrow{x^{(0)}}, \ldots, \overrightarrow{x^{(m+1)}})$ as $$O_{m-1}\big(\overrightarrow{x^{(0)}}, \cdots \overrightarrow{x^{(m+1)}}\big) = \frac{\mu \sigma a \sigma b}{I_j I_k} \Big\{ G\big(\overrightarrow{x^{(0)}}, \overrightarrow{x^{(1)}}\big) \nabla^{(1)} \Big\{ G\big(\overrightarrow{x^{(1)}}, \overrightarrow{x^{(2)}}\big) \overrightarrow{n^{(2)}} \cdot \tag{59}$$

$$\nabla^{(2)} \Big\{ \cdots G\big(\overrightarrow{x^{(m-1)}}, \overrightarrow{x^{(m)}}\big) \overrightarrow{n^{(m)}} \cdot \nabla^{(m)} \Big\{ \psi(\overrightarrow{x^{(m+1)}}) \overrightarrow{n^{(m+1)}} \cdot$$

$$\nabla^{(m+1)} G\big(\overrightarrow{x^{(m)}}, \overrightarrow{x^{(m-1)}}\big) \Big\} \cdots \Big\} \Big\} \cdot$$

$$\nabla^{(0)} \Big\{ G\big(\overrightarrow{x^{(0)}}, \overrightarrow{x^{(1)}}\big) \overrightarrow{n^{(1)}} \cdot \nabla^{(1)} \Big\{ \cdots \Big\{ G\big(\overrightarrow{x^{(m-2)}}, \overrightarrow{x^{(m-1)}}\big) \overrightarrow{n^{(m-1)}} \cdot$$

$$\nabla^{(m-1)} \Big\{ \psi(\overrightarrow{x^{(m)}}) \overrightarrow{n^{(m)}} \cdot \nabla^{(m)} G\big(\overrightarrow{x^{(m-1)}}, \overrightarrow{x^{(m)}}\big) \Big\} \Big\} \cdots \Big\}$$

the value of the integrand $O_{m-1}(\overrightarrow{x^{(0)}}, \ldots, \overrightarrow{x^{(m+1)}})$ is integrated by using the Monte Carlo method in the 2(m+1) th-dimensional space, to obtain the contribution $L_{j,k}|_{n=m-1}$ of the m-th term. Since there are two unknown letters in this case, the spatial dimension for the Monte Carlo method is twice as large as that of the first to third preferred embodiments. Specifically, consideration should be made in the total dimensional space of the (m+1)th-dimensional space with respect to the boundaries $S^{(0)}, \ldots, S^{(m)}$ and an appropriate upper limit and the (m+1)th-dimensional space with respect to the boundaries $S^{(1)}, \ldots, S^{(m+1)}$ and an appropriate upper limit. In calculation of each term, two volume integrals with respect to the analysis space V are performed and further a surface integral with respect to the boundary S is performed in accordance with the number m of terms.

Further, the error value is obtained at the same time as the contribution $L_{j,k}|_{n=m-1}$ of the m-th term is calculated, and if the error value falls within a certain value, the value of the contribution $L_{j,k}|_{n=m-1}$ of the m-th term is determined, and if exceeds the certain value, the number of generations of random numbers is reset and the calculation is started again.

Furthermore, predetermining that the calculation is stopped when the value of contribution $L_{j,k}|_{n=m}$ of the (m+1)th term is equal to or smaller than a certain ratio of the value of contribution $L_{j,k}|_{n=0}$ of the first term, addition of the contributions from the first term to the m-th term is made to obtain an approximate value of parasitic mutual (or self) inductance $L_{j,k}$ with accuracy to some degree.

Further, like in the first and second preferred embodiments, the present invention can be also applied to the case where the Neumann's boundary condition or the mixed boundary condition is given.

With the simulation method of this preferred embodiment, it is possible to obtain more accurate value of the parasitic inductance $L_{j,k}$ in consideration of the potential distribution while producing the same effect as the second or third preferred embodiment. Moreover, it is possible to directly obtain the parasitic inductance without obtaining the potential distribution.

The Fifth Preferred Embodiment

Figure 8:
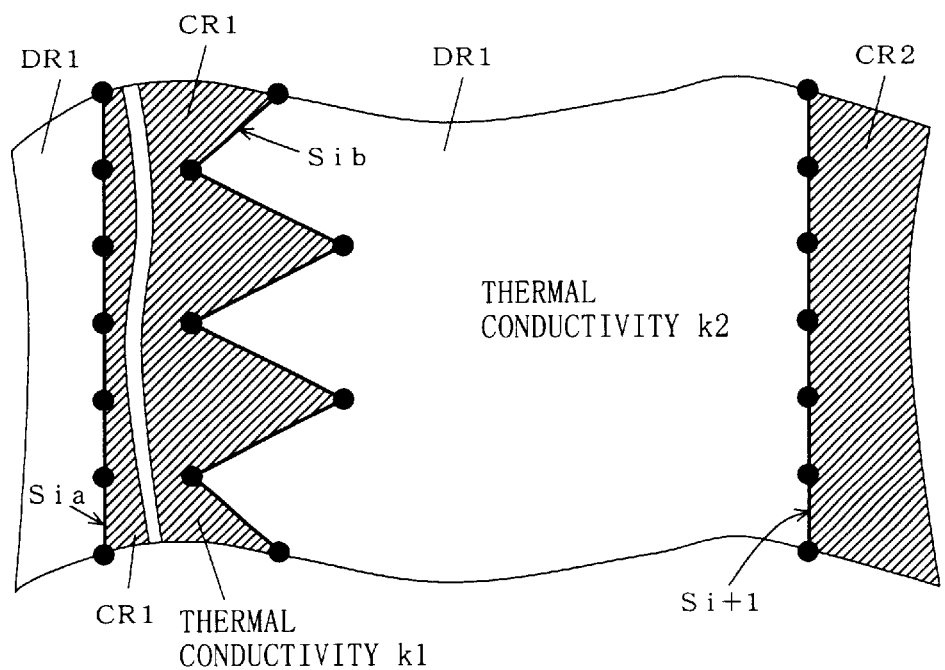
FIG. 8 illustrates part of the analysis space in accordance with the fifth preferred embodiment of the present invention.
Figure 9:
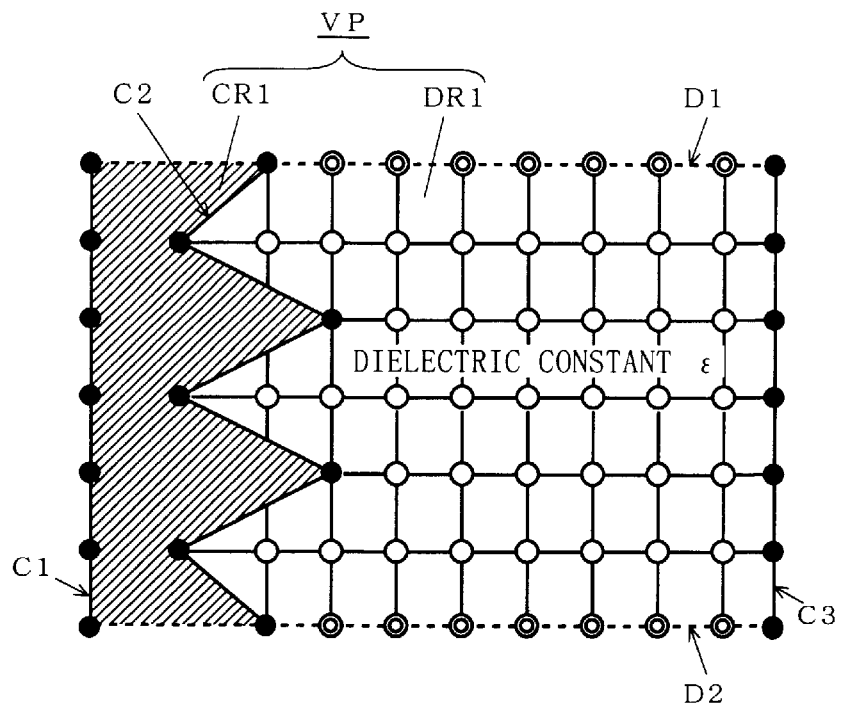
FIGS. 9 and 10 each illustrate an analysis space in the background art.
Figure 10:
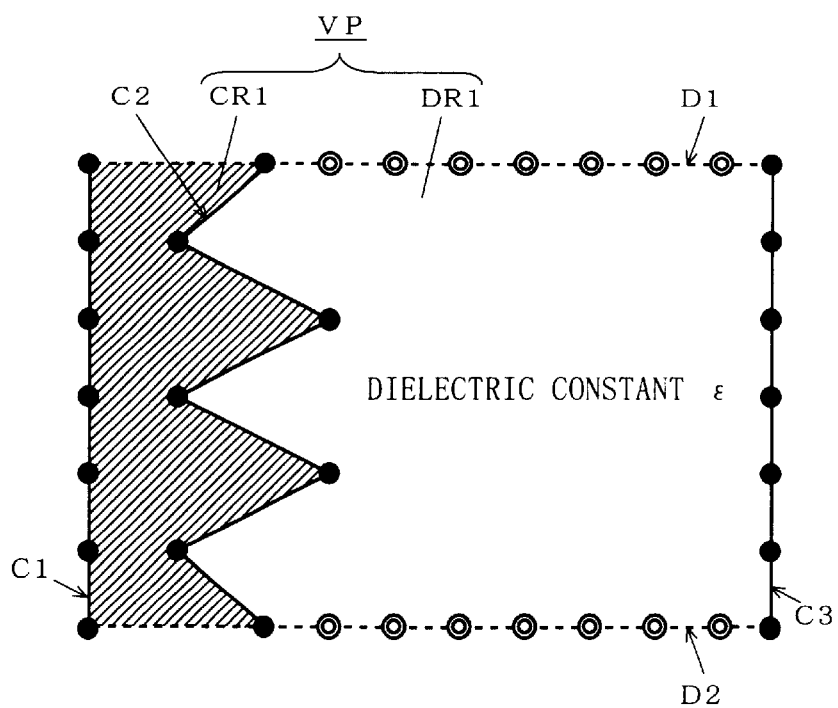

This preferred embodiment will be discussed, taking a temperature as a physical quantity, instead of a potential, and has an object of obtaining a parasitic thermal resistance in the conductor region CR1 and the dielectric region DR1 when a heat flow is applied to the conductor region CR1 and the dielectric region DR1 in the two-dimensional view of FIG. 8. FIG. 8 is an enlarged view of a partial region VP4 in the analysis space V of the model view of FIG. 1. The conductor region CR1 has the boundary $S_i$ and is separated thereby from the dielectric region DR1. The boundary $S_i$ consists of partial boundaries $S_{ia}$ and $S_{ib}$. The conductor region CR2 has the boundary $S_{i+1}$ and is separated thereby from the dielectric region DR1. The conductor region CR1 has a constant thermal conductivity k1 and the dielectric region DR1 has a constant thermal conductivity k2. The node ● is regarded as a representative point of boundary elements and is given positional (coordinate) information and information on a boundary condition. When a heat flow goes in the conductor region CR1 and the dielectric region DR1, though there is a temperature distribution in the conductor region CR1 and the dielectric region DR1, all the boundary elements in the partial boundary $S_{ia}$ are given a temperature $T_{ia}$ as a boundary condition and all the boundary elements in the partial boundary $S_{i+1}$ are given a temperature $T_{i+1}$ as a boundary condition (Dirichlet's boundary condition).

The parasitic thermal resistance $R_{i,i+1}$ between the partial boundaries $S_{ia}$ in the conductor region CR1 and the boundary $S_{i+1}$ in the conductor region CR2 is obtained as below.

It is herein assumed that a heat flow $I_{i,i+1}$ flows into the conductor region CR1 through the partial boundary $S_{ia}$ and the same heat flow $I_{i,i+1}$ flows in the conductor region CR2 through the boundary $S_{i+1}$ and the heat flow $I_{i,i+1}$ is a constant heat flow.

To obtain the parasitic thermal resistance in a certain region, the equation of continuance of heat flow as $$div\ \vec{J} = 0 \tag{60}$$

and the equation defining the temperature and heat flow density as $$\vec{J} = -k\ grad\ T \tag{61}$$

are used where $\vec{J}$, k and T represent a heat flow density vector, a thermal conductivity and a temperature, respectively. Since the heat flow is a constant heat flow, the right side is 0 in Eq. 60.

Since Eqs. 60 and 61 are in the same form as Eq. 47 and 48 of the third preferred embodiment, the equations can be considered in the same manner as the third preferred embodiment.

The heat flow $I_{i,i+1}$ can be expressed as a line integral (in the case of three dimensions, a surface integral) of the heat flow density in a surface where the heat flow goes in or out, as $$I_{i,i+1} = \int_{S_{ia}} dS\ \vec{n}\cdot\vec{J} = \int_{S_{i+1}} dS\ \vec{n}\cdot\vec{J} \tag{62}$$

Substituting Eq. 61 into Eq. 62 with attention directed to the partial boundary $S_{ia}$, $$I_{i,i+1} = \int_{S_{ia}} dS\ \vec{n}\cdot\{-k1\nabla T(\vec{x})\} \tag{63}$$

Therefore, like in the first to fourth preferred embodiments, expanding the normal differential $\vec{n}\cdot\nabla T(\vec{x})$ which is unknown by using Eq. 17, Eq. 63 can be expressed as $$I_{i,i+1} = \tag{64}$$

$$-k1\int_{S_{ia}} dSn^{(0)}\cdot\nabla^{(0)}\left\{-\oint_S dS^{(1)}\left\{T(\overrightarrow{x^{(1)}})\overrightarrow{n^{(1)}}\cdot\nabla^{(1)} G\left(\overrightarrow{x^{(0)}}, \overrightarrow{x^{(1)}}\right)\right\} - \right.$$

$$\sum_{n=1}^{\infty}\left\{\oint_S dS^{(1)}\left\{G\left(\overrightarrow{x^{(0)}}, \overrightarrow{x^{(1)}}\right)\right\}\overrightarrow{n^{(1)}}\cdot \right.$$

$$\nabla^{(1)}\left\{\cdots\left\{\oint_S dS^{(n)}\left\{G\left(\overrightarrow{x^{(n-1)}}, \overrightarrow{x^{(n)}}\right)\right\}\overrightarrow{n^{(n)}}\cdot \right.\right.$$

$$\nabla^{(n)}\left\{\oint_S dS^{(n+1)}\left\{T(\overrightarrow{x^{(n+1)}})\nabla^{(n+1)} G\left(\overrightarrow{x^{(n)}}, \right.\right.\right.$$

$$\left.\left.\left.\left.\overrightarrow{x^{(n+1)}}\right)\cdot\overrightarrow{n^{(n+1)}}\right\}\right\}\cdots\right\}\right\}$$

Defining the integrand $q_{m-1}(\vec{x^{(0)}}, \ldots, \vec{x^{(m)}})$ as $$q_{m-1}(\vec{x^{(0)}}, \ldots, \vec{x^{(m)}}) = k1\mathbf{n}^{(0)}\cdot\nabla^{(0)}\{G(\vec{x^{(0)}}, \vec{x^{(1)}})\mathbf{n}^{(1)}\cdot$$

$$\nabla^{(1)}\{\ldots\{G(\vec{x^{(m-2)}}, \vec{x^{(m-1)}})\mathbf{n}^{(m-1)}\cdot\nabla^{(m-1)}$$

$$\{T(\vec{x^{(m)}})\mathbf{n}^{(m)}\cdot\nabla^{(m)}G(\vec{x^{(m-1)}}, \vec{x^{(m)}})\}\}\ldots\}\} \tag{65}$$

the value of the integrand $q_{m-1}(\vec{x^{(0)}}, \ldots, \vec{x^{(m)}})$ is integrated by using the Monte Carlo method in the (m+1)th-dimensional space, to obtain the contribution $I_{j,i+1}|_{n=m-1}$. Further, the error value is obtained at the same time as the contribution $I_{j,i+1}|_{n=m-1}$ of the m-th term is calculated, and if the error value falls within a certain value, the value of the contribution $I_{j,i+1}|_{n=m-1}$ of the m-th term is determined, and if exceeds the certain value, the number of generations of random numbers is reset and the calculation is started again.

Furthermore, predetermining that the calculation is stopped when the value of contribution $I_{j,i+1}|_{n=m}$ of the (m+1)th term is equal to or smaller than a certain ratio of the value of contribution $I_{j,i+1}|_{n=0}$ of the first term, addition of the contributions from the first term to the m-th term is made to obtain an approximate value of heat flow $I_{j,i+1}$ with accuracy to some degree.

Using the current $I_{j,i+1}$ thus obtained together with the temperatures $T_{ia}$ and $T_{i+1}$, the value of the parasitic thermal resistance $R_{i,i+1}$ can be obtained as $$R_{i,i+1} = \frac{T_{ia} - T_{i+1}}{I_{i,i+1}} \tag{66}$$

Further, like in the first to third preferred embodiments, the present invention can be also applied to the case of three dimensions and the case where the Neumann's boundary condition or the mixed boundary condition is given.

With the simulation method of this preferred embodiment, it is possible to obtain more accurate value of the parasitic thermal resistance $R_{i,i+1}$ in consideration of the temperature distribution while producing the same effect as the second to fourth preferred embodiments. Moreover, it is possible to directly obtain the parasitic thermal resistance without obtaining the temperature distribution.

While the invention has been shown and described in detail, the foregoing description is in all aspects illustrative and not restrictive. It is therefore understood that numerous modifications and variations can be devised without departing from the scope of the invention.

What is claimed is:

1. A computer simulation method for obtaining a physical quantity at a position in an electrical element, comprising the steps of:
    (a) expressing a first function representing a first physical quantity satisfying a Poisson's equation with respect to a first variable indicating a given position in an analysis space of said electrical element, said analysis space comprising at least one region having a boundary comprising information on position and boundary condition
       in a form of a first integral with
       a difference as a first integrand
       between a product of a second function representing said first physical quantity with respect to a second variable indicating a position on said boundary and a first derivative representing a normal component on said boundary out of a differentiated result of a first Green's function on said first and second variables and said first physical quantity with respect to said second variable
       and a product of said first Green's function and a second derivative representing a normal component on said boundary out of a differentiated result of said second function with respect to said second variable, said boundary as a first integral region, and said second variable as a first variable of integration; and
    (b) substituting said first integral sequentially into either one of said second function and said second derivative that is not given as said boundary condition while updating said first variable of integration so as to provide a computer simulation to obtain said physical quantity at said given position in said analysis space of said electrical element by using said boundary condition based on a distribution of said first physical quantity.

2. The simulation method according to claim 1 further comprising the steps of:
    (c) expressing said first function as a sum of series and obtaining values of first to m-th (m $\geq$ 1) terms out of said sum of series by using said information on position and boundary condition that the said boundary comprises; and
    (d) adding all said values of said first to m-th terms obtained in said step (c) to numerically calculate a value of said first function.

3. The simulation method according to claim 2, wherein calculations for a (m+1)th term and the following terms are not performed when said value of said m-th term in said sum of series is equal to or smaller than a certain ratio of said value of said first term in said step (c).

4. The simulation method according to claim 2, wherein said boundary further comprises boundary elements, and said step (c) comprises the steps of:
    ($\alpha$) comprising a first step of choosing one of said boundary elements at random with a weight in accordance with each size of said boundary elements at each of said first variable of integration, a second step of calculating a value of said integrand that each of said terms comprises on the basis of said information on position of said one of said boundary elements, a third step of generating a random number having a predetermined upper limit, a fourth step of comparing said value of said integrand with a value of said random number and a fifth step of incrementing an integrated value when said value of said random number is smaller than said value of said integrand;
    ($\beta$) setting the number of repetitions of said step ($\alpha$);
    ($\gamma$) calculating a value of each of said terms, subsequent to said step ($\beta$), by dividing a product of said upper limit, said integrated value obtained by performing said number of repetitions of said step ($\alpha$) and information on size of said boundary obtained from said information on position of said boundary by said number of repetitions;
    ($\delta$) calculating an error, subsequent to said step of ($\gamma$), by taking a square root of a quotient obtained by dividing a remainder obtained by subtracting the square of said value of each of said terms from a product of said value of each of said terms, said upper limit and said information on size of said boundary obtained from said information on position of said boundary by said number of repetitions; and
    ($\in$) determining said value of each of said terms, subsequent to said step ($\delta$), when said error falls within a certain ratio of said value of each of said terms, or going back to said step ($\beta$) when said error exceeds.

5. The simulation method according to claim 1, wherein said at least one region means a plurality of regions, said method further comprising the steps of:
    (c) expressing a third function representing a second physical quantity in a first region which is one of said plurality of regions
       in a form of a second integral with
       a third variable representing a position on a first boundary which said first region has as a second variable of integration, a product of a third derivative representing a normal component on said first boundary out of a differentiated result of said first function with respect to said third variable on said first boundary and a first physical constant depending on a material of said first region as a second integrand, and said first boundary as a second integral region; and (d) performing said step (b) on said third function to express said third function as a first sum of series, and obtaining values of first to r-th ($r \geq 1$) terms out of said first sum of series by using said information on position and boundary condition that the said boundary comprises;

(e) adding all said values of said first to r-th terms obtained in said step (d) to numerically calculate a value of said third function;

(f) expressing a fourth function representing a second physical quantity in a second region which is one of said plurality of regions in a form of a third integral with a fourth variable representing a position on a second boundary which said second region has as a third variable of integration, a product of a fourth derivative representing a normal component on said second boundary out of a differentiated result of said first function with respect to said fourth variable on said second boundary and a second physical constant depending on a material of said second region as a third integrand, and said second boundary as a third integral region; and (g) performing said step (b) on said fourth function to express said fourth function as a second sum of series, and obtaining values of first to s-th ($s \geq 1$) terms out of said second sum of series by using said information on position and boundary condition that the said boundary comprises;

(h) adding all said values of said first to s-th terms obtained in said step (g) to numerically calculate a value of said fourth function;

(i) expressing a fifth function representing a parasitic element constant between said first and second regions in a form of a fifth integral, using a fifth variable representing a position in said first region, a sixth variable representing a position in said second region and a sixth function expressed in a form of a fourth integral with a product obtained by multiplying a fifth derivative representing a differentiated result of said first function with respect to said sixth variable in said second region by said second physical constant and a second Green's function on said fifth and sixth variables and said first physical quantity as a fourth integrand, said sixth variable as a fourth variable of integration and said second region as a fourth integral region, with a product obtained by multiplying an inner product of said sixth function and a sixth derivative representing a differentiated result of said first function with respect to said fifth variable in said first region by said first physical constant, a third physical constant depending on a material of said first region, the inverse of said third function and the inverse of said fourth function as a fifth integrand, said fifth variable as a fifth variable of integration, and said first region as a fifth integral region;

(j) performing said step (b) on said fifth function to express said fifth function as a third sum of series, and obtaining values of first to t-th ($t \geq 1$) terms out of said third sum of series by using said information on position and boundary condition that the said boundary comprises; and (k) adding all said values of said first to t-th terms obtained in said step (j) to numerically calculate a value of said fifth function.

6. The simulation method according to claim 5, wherein calculations for a (r+1)th term and the following terms are not performed when said value of said r-th term in said first sum of series is equal to or smaller than a certain ratio of said value of said first term in said step (d), calculations for a (s+1)th term and the following terms are not performed when said value of said s-th term in said second sum of series is equal to or smaller than a certain ratio of said value of said first term in said step (g), and calculations for a (t+1)th term and the following terms are not performed when said value of said t-th term in said third sum of series is equal to or smaller than a certain ratio of said value of said first term in said step (j).

7. The simulation method according to claim 5, wherein said boundary further comprises boundary elements, and said step (d) comprises the steps of:

(α) comprising a first step of choosing one of said boundary elements at random with a weight in accordance with each size of said boundary elements at each of said first variable of integration, a second step of calculating a value of said integrand that each of said terms comprises on the basis of said information on position of said one of said boundary elements, a third step of generating a random number having a predetermined upper limit, a fourth step of comparing said value of said integrand with a value of said random number and a fifth step of incrementing an integrated value when said value of said random number is smaller than said value of said integrand;

(β) setting the number of repetitions of said step (α);

(γ) calculating a value of each of said terms, subsequent to said step (β), by dividing a product of said upper limit, said integrated value obtained by performing said number of repetitions of said step (α) and information on size of said boundary obtained from said information on position of said boundary by said number of repetitions;

(δ) calculating an error, subsequent to said step of (γ), by taking a square root of a quotient obtained by dividing a remainder obtained by subtracting the square of said value of each of said terms from a product of said value of each of said terms, said upper limit and said information on size of said boundary obtained from said information on position of said boundary by said number of repetitions; and (∈) determining said value of each of said terms, subsequent to said step (δ), when said error falls within a certain ratio of said value of each of said terms, or going back to said step (β) when said error exceeds.

8. The simulation method according to claim 5, wherein said boundary further comprises boundary elements, and said step (g) comprises the steps of:
(α) comprising a first step of choosing one of said boundary elements at random with a weight in accordance with each size of said boundary elements at each of said first variable of integration, a second step of calculating a value of said integrand that each of said terms comprises on the basis of said information on position of said one of said boundary elements, a third step of generating a random number having a predetermined upper limit, a fourth step of comparing said value of said integrand with a value of said random number and a fifth step of incrementing an integrated value when said value of said random number is smaller than said value of said integrand;
(β) setting the number of repetitions of said step (α);
(γ) calculating a value of each of said terms, subsequent to said step (β), by dividing a product of said upper limit, said integrated value obtained by performing said number of repetitions of said step (α) and information on size of said boundary obtained from said information on position of said boundary by said number of repetitions;
(δ) calculating an error, subsequent to said step of (γ), by taking a square root of a quotient obtained by dividing a remainder obtained by subtracting the square of said value of each of said terms from a product of said value of each of said terms, said upper limit and said information on size of said boundary obtained from said information on position of said boundary by said number of repetitions; and
(∈) determining said value of each of said terms, subsequent to said step (δ), when said error falls within a certain ratio of said value of each of said terms, or going back to said step (β) when said error exceeds.

9. The simulation method according to claim 5, wherein said boundary further comprises boundary elements, and said step (j) comprises the steps of:
(α) comprising a first step of choosing one of said boundary elements at random with a weight in accordance with each size of said boundary elements at each of said first variable of integration, a second step of calculating a value of said integrand that each of said terms comprises on the basis of said information on position of said one of said boundary elements, a third step of generating a random number having a predetermined upper limit, a fourth step of comparing said value of said integrand with a value of said random number and a fifth step of incrementing an integrated value when said value of said random number is smaller than said value of said integrand;
(β) setting the number of repetitions of said step (α);
(γ) calculating a value of each of said terms, subsequent to said step (j), by dividing a product of said upper limit, said integrated value obtained by performing said number of repetitions of said step (Ga) and information on size of said boundary obtained from said information on position of said boundary by said number of repetitions;
(δ) calculating an error, subsequent to said step of (γ), by taking a square root of a quotient obtained by dividing a remainder obtained by subtracting the square of said value of each of said terms from a product of said value of each of said terms, said upper limit and said information on size of said boundary obtained from said information on position of said boundary by said number of repetitions; and
(∈) determining said value of each of said terms, subsequent to said step (δ), when said error falls within a certain ratio of said value of each of said terms, or going back to said step (β) when said error exceeds.

10. A computer simulation method for obtaining a parasitic element constant in an electrical element, comprising the steps of:
(a) expressing a first function representing a first physical quantity satisfying a Poisson's equation with respect to a first variable indicating a given position in an analysis space of said electrical element, said analysis space comprising at least one region having a boundary comprising information on position and boundary condition
in a form of a first integral with
a difference as a first integrand
between a product of a second function representing said first physical quantity with respect to a second variable indicating a position on said boundary and a first derivative representing a normal component on said boundary out of a differentiated result of a first Green's function on said first and second variables and said first physical quantity with respect to said second variable
and a product of said first Green's function and a second derivative representing a normal component on said boundary out of a differentiated result of said second function with respect to said second variable, said boundary as a first integral region, and
said second variable as a first variable of integration; and
(b) substituting said first integral sequentially into either one of said second function and said second derivative that is not given as said boundary condition while updating said first variable of integration so as to provide a computer simulation to obtain said parasitic element constant in said analysis space of said electrical element by using said boundary condition based on a distribution of said first physical quantity,
said at least one region means a plurality of regions, said method further comprising the steps of:
(c) expressing a third function representing a second physical quantity in a first region which is one of said plurality of regions
in a form of a second integral with
a product of a third derivative representing a normal component function said boundary of said first region out of a differentiated result of said first function with respect to said first variable on said boundary of said first region and a physical constant depending on a material of said first region as a second integrand,
said first variable as a second variable of integration, and
said boundary of said first region as the second integral region; and
(d) performing said step (b) on a fourth function representing a parasitic element constant between said first region and a second region which is one of said plurality of regions obtained by differentiating said third function with respect to said second function in said second region to express said fourth function as a sum of series, and obtaining values of first to n-th (n≧1) terms out of said sum of series by using said information on position and boundary condition that the said boundary comprises; and (e) adding all said values of said first to n-th terms obtained in said step (d) to numerically calculate a value of said fourth function.

11. The simulation method according to claim 10, wherein calculations for a (n+1)th term and the following terms are not performed when said value of said n-th term in said sum of series is equal to or smaller than a certain ratio of said value of said first term in said step (d).

12. The simulation method according to claim 10, wherein said boundary further comprises boundary elements, and said step (d) comprises the steps of:

(α) comprising a first step of choosing one of said boundary elements at random with a weight in accordance with each size of said boundary elements at each of said first variable of integration, a second step of calculating a value of said integrand that each of said terms comprises on the basis of said information on position of said one of said boundary elements, a third step of generating a random number having a predetermined upper limit, a fourth step of comparing said value of said integrand with a value of said random number and a fifth step of incrementing an integrated value when said value of said random number is smaller than said value of said integrand;

(β) setting the number of repetitions of said step (α);

(γ) calculating a value of each of said terms, subsequent to said step (β), by dividing a product of said upper limit, said integrated value obtained by performing said number of repetitions of said step (α) and information on size of said boundary obtained from said information on position of said boundary by said number of repetitions;

(δ) calculating an error, subsequent to said step of (γ), by taking a square root of a quotient obtained by dividing a remainder obtained by subtracting the square of said value of each of said terms from a product of said value of each of said terms, said upper limit and said information on size of said boundary obtained from said information on position of said boundary by said number of repetitions; and (∈) determining said value of each of said terms, subsequent to said step (δ), when said error falls within a certain ratio of said value of each of said terms, or going back to said step (β) when said error exceeds.

13. A computer simulation method for obtaining a physical quantity at a position in an electrical element, comprising the steps of:

(a) expressing a first function representing a first physical quantity satisfying a Poisson's equation with respect to a first variable indicating a given position in an analysis space of said electrical element, said analysis space comprising at least one region having a boundary comprising information on position and boundary condition in a form of a first integral with a difference as a first integrand between a product of a second function representing said first physical quantity with respect to a second variable indicating a position on said boundary and a first derivative representing a normal component on said boundary out of a differentiated result of a first Green's function on said first and second variables and said first physical quantity with respect to said second variable and a product of said first Green's function and a second derivative representing a normal component on said boundary out of a differentiated result of said second function with respect to said second variable, said boundary as a first integral region, and said second variable as a first variable of integration; and (b) substituting said first integral sequentially into either one of said second function and said second derivative that is not given as said boundary condition while updating said first variable of integration, said method further comprising the steps of:

(c) expressing a third function representing a second physical quantity in said region in a form of a second integral with a product of a third derivative representing a normal component on said boundary out of a differentiated result of a first function with respect to said first variable on said boundary and a first physical constant depending on a material of said region as a second integrand, said first variable as a second variable of integration, and said boundary as the second integral region; and (d) performing said step (b) on said third function to express said third function as a first sum of series so as to provide a computer simulation to obtain said physical quantity at said given position in said analysis space of sail electrical element by using said boundary condition based on a distribution of said first physical quantity, and obtaining values of first to p-th (p≧1) terms out of said first sum of series by using said information on position and boundary condition that the said boundary comprises; and (e) adding all said values of said first to p-th terms obtained in said step (d) to numerically calculate a value of said third function.

14. The simulation method according to claim 13, wherein calculations for a (p+1)th term and the following terms are not performed when said value of said p-th term in said sum of series is equal to or smaller than a certain ratio of said value of said first term in said step (d).

15. The simulation method according to claim 13, wherein said boundary further comprises boundary elements, said step (d) comprises the steps of:

(α) comprising a first step of choosing one of said boundary elements at random with a weight in accordance with each size of said boundary elements at each of said first variable of integration, a second step of calculating a value of said integrand that each of said terms comprises on the basis of said information on position of said one of said boundary elements, a third step of generating a random number having a predetermined upper limit, a fourth step of comparing said value of said integrand with a value of said random number and a fifth step of incrementing an integrated value when said value of said random number is smaller than said value of said integrand;

(β) setting the number of repetitions of said step (α);

(γ) calculating a value of each of said terms, subsequent to said step (β), by dividing a product of said upper limit, said integrated value obtained by performing said number of repetitions of said step (α) and information on size of said boundary obtained from said information on position of said boundary by said number of repetitions;

(δ) calculating an error, subsequent to said step of (γ), by taking a square root of a quotient obtained by dividing a remainder obtained by subtracting the square of said value of each of said terms from a product of said value of each of said terms, said upper limit and said information on size of said boundary obtained from said information on position of said boundary by said number of repetitions; and (∈) determining said value of each of said terms, subsequent to said step (δ) when said error falls within a certain ratio of said value of each of said terms, or going back to said step (β) when said error exceeds.

16. The simulation method according to claim 13 further comprising the step of:

(f) dividing difference between said second function of a position in said region and said second function of another position in said region by said third function, to numerically calculate a value of a fourth function representing a parasitic element constant in said region.

17. The simulation method according to claim 13 further comprising the steps of:

(f) expressing a fourth function representing a parasitic element constant in said region
in a form of a fourth integral,
using a third variable and a fourth variable both of which indicate positions in said region and a fifth function expressed in a form of a third integral with a product obtained by multiplying a fourth derivative representing a differentiated value of said first function with respect to said fourth variable in said region by said first physical constant and a second Green's function on said third and fourth variables and said first physical quantity as a third integrand, said fourth variable as a third variable of integration and said region as a third integral region,
with a product obtained by multiplying an inner product of said fifth function and a fifth derivative representing a differentiated value of said first function with respect to said third variable in said region by said first physical constant, a second physical constant depending on a material of said region and the inverse of the square of a value of said third function as a fourth integrand,
said third variable as a fourth variable of integration, and
said region as a fourth integral region;

(g) performing said step (b) on said fourth function to express said fourth function as a second sum of series, and
obtaining values of first to q-th (q≧1) terms out of said second sum of series by using said information on position and boundary condition that the said boundary comprises; and (h) adding all said values of said first to q-th terms obtained in said step (g) to numerically calculate a value of said fourth function.

18. The simulation method according to claim 17, wherein calculations for a (q+1)th term and the following terms are not performed when said value of said q-th term in said second sum of series is equal to or smaller than a certain ratio of said value of said first term in said step (g).

19. The simulation method according to claim 17, wherein
said boundary further comprises boundary elements, and
said step (g) comprises the steps of:

(α) comprising a first step of choosing one of said boundary elements at random with a weight in accordance with each size of said boundary elements at each of said first variable of integration, a second step of calculating a value of said integrand that each of said terms comprises on the basis of said information on position of said one of said boundary elements, a third step of generating a random number having a predetermined upper limit, a fourth step of comparing said value of said integrand with a value of said random number and a fifth step of incrementing an integrated value when said value of said random number is smaller than said value of said integrand;

(β) setting the number of repetitions of said step (α);

(γ) calculating a value of each of said terms, subsequent to said step (β), by dividing a product of said upper limit, said integrated value obtained by performing said number of repetitions of said step (α) and information on size of said boundary obtained from said information on position of said boundary by said number of repetitions;

(δ) calculating an error, subsequent to said step of (γ), by taking a square root of a quotient obtained by dividing a remainder obtained by subtracting the square of said value of each of said terms from a product of said value of each of said terms, said upper limit and said information on size of said boundary obtained from said information on position of said boundary by said number of repetitions; and (∈) determining said value of each of said terms, subsequent to said step (δ), when said error falls within a certain ratio of said value of each of said terms, or going back to said step (β) when said error exceeds.

* * * * *